United States Patent
Suzuki et al.

(10) Patent No.: US 11,383,311 B2
(45) Date of Patent: Jul. 12, 2022

(54) COMPOUND MITER SAW

(71) Applicant: MAKITA CORPORATION, Anjo (JP)

(72) Inventors: Yukinori Suzuki, Anjo (JP); Toshiyuki Kani, Anjo (JP); Yuki Miwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/930,769

(22) Filed: Jul. 16, 2020

(65) Prior Publication Data
US 2021/0053129 A1 Feb. 25, 2021

(30) Foreign Application Priority Data

Aug. 23, 2019 (JP) ............................. JP2019-152701
Mar. 5, 2020 (JP) ............................. JP2020-037920

(51) Int. Cl.
*B23D 45/04* (2006.01)
*B23D 47/02* (2006.01)
*B27B 5/29* (2006.01)

(52) U.S. Cl.
CPC ......... *B23D 45/048* (2013.01); *B23D 47/025* (2013.01); *B27B 5/29* (2013.01); *Y10T 83/7697* (2015.04); *Y10T 83/7788* (2015.04); *Y10T 83/8773* (2015.04)

(58) Field of Classification Search
CPC ... Y10T 83/7697; Y10T 83/8773; B27B 5/29; B23D 45/044; B23D 45/048
USPC ....................................................... 83/471.3
See application file for complete search history.

(56) References Cited

U.S. PATENT DOCUMENTS 5,870,939 A * 2/1999 Matsubara ........... B23D 47/025
83/471.3
6,532,853 B1 * 3/2003 Kakimoto ............ B23D 45/044
83/471.3
6,658,977 B2 * 12/2003 Chang .................. B23D 45/044
83/471.3

(Continued)

FOREIGN PATENT DOCUMENTS

DE 202015000495 U1 2/2015
JP H09136215 A 5/1997

(Continued)

*Primary Examiner* — Laura M Lee
(74) *Attorney, Agent, or Firm* — J-Tek Law PLLC; Jeffrey D. Tekanic; Scott T. Wakeman

(57) ABSTRACT

A compound miter saw (1; 70; 90) includes a turntable-fixing mechanism (40) and a tilt-fixing mechanism (60; 80; 100) configured to respectively fix the miter angle and tilt (bevel) angle of a cutting-machine main body (10). The turntable-fixing mechanism includes a fixing rod (42) configured to lock rotation of a turntable (4; 91) relative to a base (2) by manually rotating a grip (41) attached thereto, and is disposed forward of a front surface of a table-extension part (5; 71; 92), downward of an upper surface of the turntable, and at the center of the table-extension part in the left-right direction. The tilt-fixing mechanism includes a manually rotatable tilt-fixing manipulatable part (61; 81; 101) provided between the front surface of the table-extension part and the grip. A rotary shaft (61*a*; 82*a*; 102*a*) of the tilt-fixing manipulatable part is coaxial with the fixing rod (rotary shaft) attached to the grip.

23 Claims, 27 Drawing Sheets

(56) References Cited

U.S. PATENT DOCUMENTS

| | | | |
|---|---|---|---|
| 7,574,950 B2 * | 8/2009 | Hetcher | B23D 45/044 83/473 |
| 7,798,041 B2 * | 9/2010 | Hetcher | B27B 5/29 83/471.3 |
| RE41,857 E * | 10/2010 | Chang | B27B 5/29 83/490 |
| 7,854,187 B2 | 12/2010 | Liu et al. | |
| 8,061,251 B2 * | 11/2011 | Hetcher | B23D 47/025 83/471.3 |
| RE44,057 E * | 3/2013 | Chang | B23D 45/044 83/490 |
| 9,662,724 B1 | 5/2017 | Knight | |
| 9,833,849 B2 | 12/2017 | Knight | |
| 10,099,301 B2 | 10/2018 | Chiang et al. | |
| 10,322,459 B1 | 6/2019 | Chang | |
| 2003/0024365 A1 * | 2/2003 | Chang | B23D 45/044 83/471.3 |
| 2005/0247177 A1 * | 11/2005 | Hetcher | B23D 47/025 83/471.3 |
| 2005/0284276 A1 * | 12/2005 | Talesky | B23D 47/025 83/471.3 |
| 2006/0011036 A1 | 1/2006 | Ushiwata et al. | |
| 2007/0175305 A1 | 8/2007 | Svetlik et al. | |
| 2009/0107316 A1 | 4/2009 | Thomas | |
| 2009/0199689 A1 * | 8/2009 | Hetcher | B27B 5/29 83/473 |
| 2009/0235796 A1 | 9/2009 | Kani et al. | |
| 2011/0036224 A1 * | 2/2011 | Liu | B27B 5/29 83/471.3 |
| 2011/0209593 A1 | 9/2011 | Kani et al. | |
| 2013/0160628 A1 | 6/2013 | Chiu | |
| 2016/0318108 A1 | 11/2016 | Gonzalez et al. | |
| 2018/0133817 A1 | 5/2018 | Yamamura | |
| 2019/0314908 A1 | 10/2019 | Aoyama et al. | |
| 2021/0039177 A1 | 2/2021 | Yamamura et al. | |

FOREIGN PATENT DOCUMENTS

| | | |
|---|---|---|
| JP | H09207023 A | 8/1997 |
| JP | H09277118 A | 10/1997 |
| JP | H1148029 A | 2/1999 |
| JP | 2002200602 A | 7/2002 |
| JP | 2006044220 A | 2/2006 |
| JP | 2007083610 A | 4/2007 |
| JP | 2009066718 A | 4/2009 |
| JP | 2009226529 A | 10/2009 |
| JP | 2010058229 A | 3/2010 |
| JP | 2012066366 A | 4/2012 |
| JP | 2015150633 A | 8/2015 |
| JP | 2018075692 A | 5/2018 |
| WO | 2018088412 A1 | 5/2018 |

\* cited by examiner

COMPOUND MITER SAW

CROSS-REFERENCE

The present application claims priority to Japanese patent application serial number 2019-152701 filed on Aug. 23, 2019 and to Japanese patent application serial number 2020-037920 filed on Mar. 5, 2020, the contents of both of which are hereby fully incorporated by reference.

TECHNICAL FIELD

The present invention generally relates to benchtop cutting machines, such as compound miter saws, used in, for example, the cutting of wood materials and, in particular relates to benchtop cutting machines that are capable of performing a bevel cut, including without limitation compound miter saws and other types of compound miter saws having additional functions, such as dual-bevel compound miter saws, sliding compound miter saws, and dual-bevel sliding compound miter saws.

BACKGROUND ART

Compound miter saws, typically comprise: a base, which is placed (supported) on, for example, a benchtop, work stand, floor or the like; a turntable, which is supported on the base so as to be rotatable in a horizontal plane relative to the base; and a cutting-machine main body (carriage) that is supported upward of the turntable. To cut a workpiece placed on the turntable, a cutting tool, which is rotatably supported by the cutting-machine main body, is pivoted downward to cut into the workpiece. The cutting-machine main body is also tiltable in the clockwise and counterclockwise directions relative to the turntable and thereby is capable of performing a bevel cut. In such compound miter saws, a tilt-fixing manipulatable part (e.g., a lever or knob) is provided for releasably fixing the cutting-machine main body at a desired tilt (bevel) angle in the clockwise and counterclockwise directions relative to the turntable, and thereby the position (orientation) of the cutting-machine main body is fixable at that tilt (bevel) angle. As a result, bevel cuts can be made, in which, for example, the cutting-machine main body is tilted 45° clockwise, and the cutting tool is caused to cut into the workpiece at the 45° bevel angle.

As described in, for example, Japanese Laid-open Patent Publication 2009-226529 and its family member US 2009/0235796, it is known to provide the tilt-fixing manipulatable part (fixing lever) on a rear-surface side (rear side) of a main-body tilting part (body supporting member) that tiltably supports the cutting machine body. The main-body tilting part is provided rearward of the turntable (table). That is, such a tilt-fixing manipulatable part is provided at a location distant from a user, who is located (standing) forward of the table cutting machine during operation of the table cutting machine. Consequently, because the user's hand must extend rearward of the main-body tilting part (or the user must move to the rear of the main-body tilting part) to operate the tilt-fixing manipulatable part, the tilt-fixing manipulatable part is located at an inconvenient position for manipulation between performing different bevel cuts.

The benchtop cutting machine described in Japanese Laid-open Patent Publication 2015-150633 and its family member DE 202015000495 U1 comprises a tilt-fixing manipulatable part, which is located forward of slide bars extending forward from a main-body tilting part. The manipulation force of the tilt-fixing manipulatable part is transmitted, via for example, a plurality of gears, to a screw that couples the main-body tilting part and the turntable. Alternatively, the manipulation force of the tilt-fixing manipulatable part is transmitted via, for example, a drive-side pulley, a follower-side pulley, and a belt that bridges them, to the screw that couples the main-body tilting part and the turntable. Accordingly, because the configuration of the tilt-fixing manipulatable mechanism is complex and because the part count is high, there is room for improvement.

The table-top cutting machine described in Japanese Laid-open Patent Publication H11-48029 and its family member U.S. Pat. No. 6,532,853 provides a tilt-fixing manipulatable part (inclination locking operation handle) on a table-extension part (rectangular portion), which extends forward from the turntable. This tilt-fixing manipulatable part is provided forward of a turntable-fixing manipulatable part (turntable locking operation handle) configured to fix the turntable at a fixed angle (miter angle) in the horizontal direction. The turntable-fixing manipulatable part functions also as a grasp part for rotating the turntable in the left-right direction. However, the tilt-fixing manipulatable part and the turntable-fixing manipulatable part are provided at a location spaced apart (offset) from the center of the table-extension part in the left-right direction. Therefore, a cutting plane of the cutting tool is offset from the turntable-fixing manipulatable part in the left-right direction. Consequently, when the miter angle of the turntable is to be adjusted, it is, e.g., difficult to align marking lines marked on the workpiece with the cutting plane of the cutting tool. In addition, when the turntable-fixing manipulatable part is grasped and the turntable is to be rotated, such manipulation is difficult without also grasping the tilt-fixing manipulatable part located on the near side. However, if the tilt-fixing manipulatable part is grasped together with the turntable-fixing manipulatable part, there is a risk that the tilt-fixing manipulatable part will be mis-manipulated. In addition, the knob of the tilt-fixing manipulatable part necessarily must be narrower than the knob of the turntable-fixing manipulatable part. Therefore, owing to the relatively small size of the knob of the tilt-fixing manipulatable part, it is difficult for the user to transmit sufficient manipulation force (torque) from the tilt-fixing manipulatable part to the rearwardly-located main-body tilting part.

SUMMARY OF THE INVENTION

It is therefore one non-limiting object of the present teachings to disclose techniques for improving the ease of operation of a tilt-fixing manipulatable part that may be utilized in a benchtop cutting machine capable of performing a bevel cut, such as a compound miter saw.

In one aspect of the present disclosure, a benchtop cutting machine, such as a compound miter saw, comprises a base, a turntable, a cutting-machine main body, and a turntable-fixing mechanism. The turntable is supported on the base so as to be rotatable in a horizontal plane relative to the base. The cutting-machine main body is provided upward of the turntable and rotatably supports a cutting tool. The turntable-fixing mechanism is capable of fixing the turntable with respect to the base so that the turntable does not rotate relative to the base in the horizontal plane. The benchtop cutting machine also comprises a main-body tilting part and a tilt-fixing mechanism. The main-body tilting part is provided rearward of the turntable and supports the cutting-machine main body so that it is tiltable in the clockwise and counterclockwise directions relative to the turntable. The tilt-fixing mechanism is capable of fixing the tilt angle (bevel angle) of the cutting-machine main body in the clockwise and counterclockwise directions relative to the turntable. The turntable-fixing mechanism comprises a turntable-fixing manipulatable part, which is manually rotatable, and a turntable-fixing member. The turntable-fixing member is configured to fix (lock rotation of) the turntable relative to the base by manually rotating the turntable-fixing manipulatable part. The turntable-fixing manipulatable part is disposed forward of a front surface of the turntable, downward of an upper surface of the turntable, and at the center of the turntable in the left-right direction. The tilt-fixing mechanism comprises a tilt-fixing manipulatable part, which is manually rotatable. A rotary shaft of the tilt-fixing manipulatable part is provided coaxially with a rotary shaft (turntable-fixing member) of the turntable-fixing manipulatable part. The tilt-fixing manipulatable part is provided forward of the front surface of the turntable and rearward of the turntable-fixing manipulatable part.

In the above-described aspect of the present teachings, because the turntable-fixing manipulatable part and the tilt-fixing manipulatable part are both located on the front portion of the turntable, it is easy for a user to manipulate (rotate) the turntable-fixing manipulatable part or the tilt-fixing manipulatable part while the user is positioned (standing) in front of the benchtop cutting machine. That is, the ease of operation of the tilt-fixing manipulatable part can be improved, as compared to the above-described known benchtop cutting machines, while maintaining the excellent ease of operation of the turntable-fixing manipulatable part. In addition, the turntable-fixing manipulatable part, which is manipulated more frequently, is provided forward of the tilt-fixing manipulatable part and thus is nearer to the user, who is positioned (standing) in front of the benchtop cutting machine. Accordingly, it is possible to reduce the risk that the tilt-fixing manipulatable part will be mistakenly manipulated instead of the turntable-fixing manipulatable part. Furthermore, the turntable-fixing manipulatable part also functions as a manipulatable part that the user grasps when rotating (turning) the turntable in the horizontal plane. Consequently, because the turntable-fixing manipulatable part is located farther from the rotational center of the turntable, greater leverage is provided and thus the turntable can be easily rotated relative to the base by grasping and moving the turntable-fixing manipulatable part in the left-right direction.

The tilt-fixing mechanism may comprise a tilt-fixing transmission shaft, which extends in the front-rear direction from a front portion of the turntable to the main-body tilting part. The tilt-fixing transmission shaft is preferably provided between a center of rotation and a left-end portion of the turntable or between the center of rotation and a right-end portion of the turntable. That is, the tilt-fixing transmission shaft preferably does not intersect the center of rotation of the turntable, but rather passes to the left or the right of the rotational center (rotary spindle) of the turntable so that the tilt-fixing transmission shaft may be constituted by a straight rod.

In such an embodiment of the present teachings, the tilt-fixing transmission shaft can be provided in the empty space in a lower portion of the turntable, so that it circumvents (avoids) the rotary spindle of the turntable that supports rotation of the turntable relative to the base. Consequently, axial forces and/or the rotational forces can be transmitted along the tilt-fixing transmission shaft without hinderance, and the manipulation force (e.g., torque) applied by the user to the tilt-fixing manipulatable part is transmitted without significant losses to the main-body tilting part.

In addition, the benchtop cutting machine may comprise a positive-lock mechanism, which positions (locks, e.g., positively locks/stops) the turntable at one of a plurality of prescribed (predetermined) rotational (miter) angles. The tilt-fixing transmission shaft is preferably aligned (parallel) in the left and right direction with respect to the turntable-fixing member. The positive-lock mechanism is located downward of the turntable-fixing member.

In such an embodiment of the present teachings, the turntable-fixing mechanism and the tilt-fixing mechanism are disposed in a compact manner in the up-down direction. Furthermore, the positive-lock mechanism can be disposed downward of the turntable-fixing member, which is vacant, thereby enabling the turntable-fixing mechanism, the tilt-fixing mechanism and the positive-lock mechanism to be arranged in a compact manner in the up-down direction. Thereby, the turntable-fixing mechanism, the tilt-fixing mechanism, and the positive-lock mechanism can be disposed such that they are easy to operate (manipulate) while minimizing the amount of space required downward of the table surface. This may permit the height of the turntable in the up-down direction to be reduced, thereby reducing the overall size and weight of the benchtop cutting machine.

In addition or in the alternative to the preceding embodiment, the tilt-fixing mechanism may comprise a pivot rod that is pivotable (within a horizontal plane, i.e. that extends in the left-right, front-rear directions) in the front-rear direction. The tilt-fixing manipulatable part comprises a screw-shaft part (e.g., a circular-cylindrical sleeve with an external male thread), which displaces (moves) in the front-rear direction when the tilt-fixing manipulatable part is manually rotated. One side (axial end) of the pivot rod is configured to abut the screw-shaft part that is connected to tilt-fixing manipulatable part so as to rotate therewith, and the other side (axial end) of the pivot rod is operably coupled (linked) to the tilt-fixing transmission shaft. Therefore, when the screw-shaft part is displaced rearwardly in response to manual rotation of the tilt-fixing manipulatable, the screw-shaft part abuts and presses against the one side (axial end) of the pivot rod, thereby causing the pivot rod to pivot and generate a forward pulling force on the tilt-fixing transmission shaft. This forward pulling force causes the main-body tilting part to pressed (clamped) and thereby fixed to the turntable.

In such an embodiment of the present teachings, the tilt-fixing mechanism can be configured using a simple structure. Thereby, the tilt-fixing mechanism can be provided compactly. In addition, maintenance of the tilt-fixing mechanism is easy or the tilt-fixing mechanism is even maintenance-free, and the ease of operation of the tilt-fixing manipulatable part is easy to maintain.

In another embodiment of the above-described feature of the present disclosure, the tilt-fixing mechanism may comprise a speed-reducing gear part that comprises a drive-side gear, which is provided on the tilt-fixing manipulatable part (so as to rotate therewith), and a follower-side gear, which is provided on the tilt-fixing transmission shaft (so as to rotate therewith). A threaded shaft end is provided at (on) a rear portion of the tilt-fixing transmission shaft. A nut is threadably mounted on the threaded shaft end such that rotation of the nut is restricted (blocked). In this embodiment, when the tilt-fixing manipulatable part is manually rotated, the tilt-fixing transmission shaft is caused by the speed-reducing gear part to rotate about its axis such that the threaded shaft end rotates relative to the nut. As a result, the main-body tilting part is pressed (clamped) and thereby fixed to the turntable by the tightening of the threaded shaft end and the nut to one another (i.e. by the rotation of the threaded shaft end relative to the nut, which causes the nut to move axially forward).

In such an embodiment of the present teachings, the speed-reducing gear part may be configured such that its output torque is greater than the input torque applied by manually rotating the tilt-fixing manipulatable part. That is, the speed-reducing gear part preferably provides a mechanical advantage that amplifies the force (torque) applied to the tilt-fixing manipulatable part. For example, the speed-reducing gear part may be designed to amplify (increase) the input torque by at least 30%, preferably at least 40%, preferably at least 50%, or even at least 80% or 100%. Therefore, the threaded shaft end and the nut can be tightened using a large torque without increasing the size of the tilt-fixing mechanism (knob) in the left-right direction. Consequently, even if the tilt-fixing manipulatable part is manipulated (rotated) with a relatively small torque, a relatively large torque is applied to the threaded shaft end to achieve a secure fixing (clamping) of the main-body tilting part (support arm) relative to the turntable.

Such an embodiment of the benchtop cutting machine may further comprise a support part, which supports the tilt-fixing transmission shaft with respect to the turntable and/or which is mounted on the tilt-fixing transmission shaft. The main-body tilting part is fixed by sandwiching (clamping) the main-body tilting part and a portion of the turntable between the support part and the nut. Accordingly, the axial force (torque) that fixes the main-body tilting part acts between the support part and the nut. Consequently, an axial force does not arise in the tilt-fixing transmission shaft forward of the support part. This means that the main-body tilting part can be fixed without a load being applied to the turntable.

In such an embodiment of the present teachings, the support part may include a thrust needle bearing disposed around the tilt-fixing transmission shaft and configured to receive (be subjected to) a large force in the axial direction of the tilt-fixing transmission shaft. Thereby, the main-body tilting part can be fixed with respect to the turntable with a large axial force while the thrust needle bearing facilitates rotation of the support part relative to the portion of the turntable that contacts the support part when the nut is tightened on the transmission shaft.

In addition or in the alternative to the two preceding embodiments, the main-body tilting part may be configured to be tiltable in the clockwise and counterclockwise directions about a clockwise-counterclockwise tilting pivot. The nut may have a circular sector shape that matches an arcuate shape of arcuate-shaped inner-circumferential wall, which is defined on the main-body tilting part and is centered on the clockwise-counterclockwise tilting pivot. Accordingly, when the main-body tilting part is tilted clockwise or counterclockwise relative to the turntable, the arcuate-shaped inner-circumferential wall smoothly moves (slides) along the circular sector shape of the (stationary) nut so that the main-body tilting can smoothly move (slide) relative to the nut. Furthermore, rotation of the nut about the axis of the tilt-fixing transmission shaft can be restricted (blocked) by an inner-circumferential-side side surface and an outer-circumferential-side side surface of the circular sector shape of the nut. Consequently, because a large axial force can be received by the (non-rotatable) nut, the main-body tilting part can be fixed (clamped) with respect to the turntable by using a relatively large axial force (clamping force).

In addition or in the alternative to the preceding embodiments, a rear-portion cover may be provided rearward of the main-body tilting part. The rear-portion cover is preferably designed to prevent (block) the ingress of wood chips, dust, etc. by covering the surrounding of the tilt-fixing transmission shaft and the like. Thereby, a loss of axial force caused by intervening wood chips, dust, etc. can be curtailed and the main-body tilting part can be fixed with a large axial force (clamping force) in a durable manner. In addition, by preventing the ingress of wood chips, dust, etc. that would increase friction, the main-body tilting part can be smoothly tilted clockwise and counterclockwise in a durable manner.

In addition or in the alternative to the preceding embodiments, a front-portion cover may be provided on a bottom surface of a table-extension part, such as underneath the speed-reducing gear part. Accordingly, it is possible to prevent the ingress of wood chips, dust, etc., e.g., into the speed-reducing gear part. Consequently, the rotation of the tilt-fixing manipulatable part can be more reliably transmitted to the rear portion of the tilt-fixing transmission shaft such that the manipulation (manual rotation) for fixing the main-body tilting part at the desired bevel angle remains smooth during operation.

DETAILED DESCRIPTION OF EMBODIMENTS OF THE INVENTION

First Exemplary Embodiment

Figure 1:
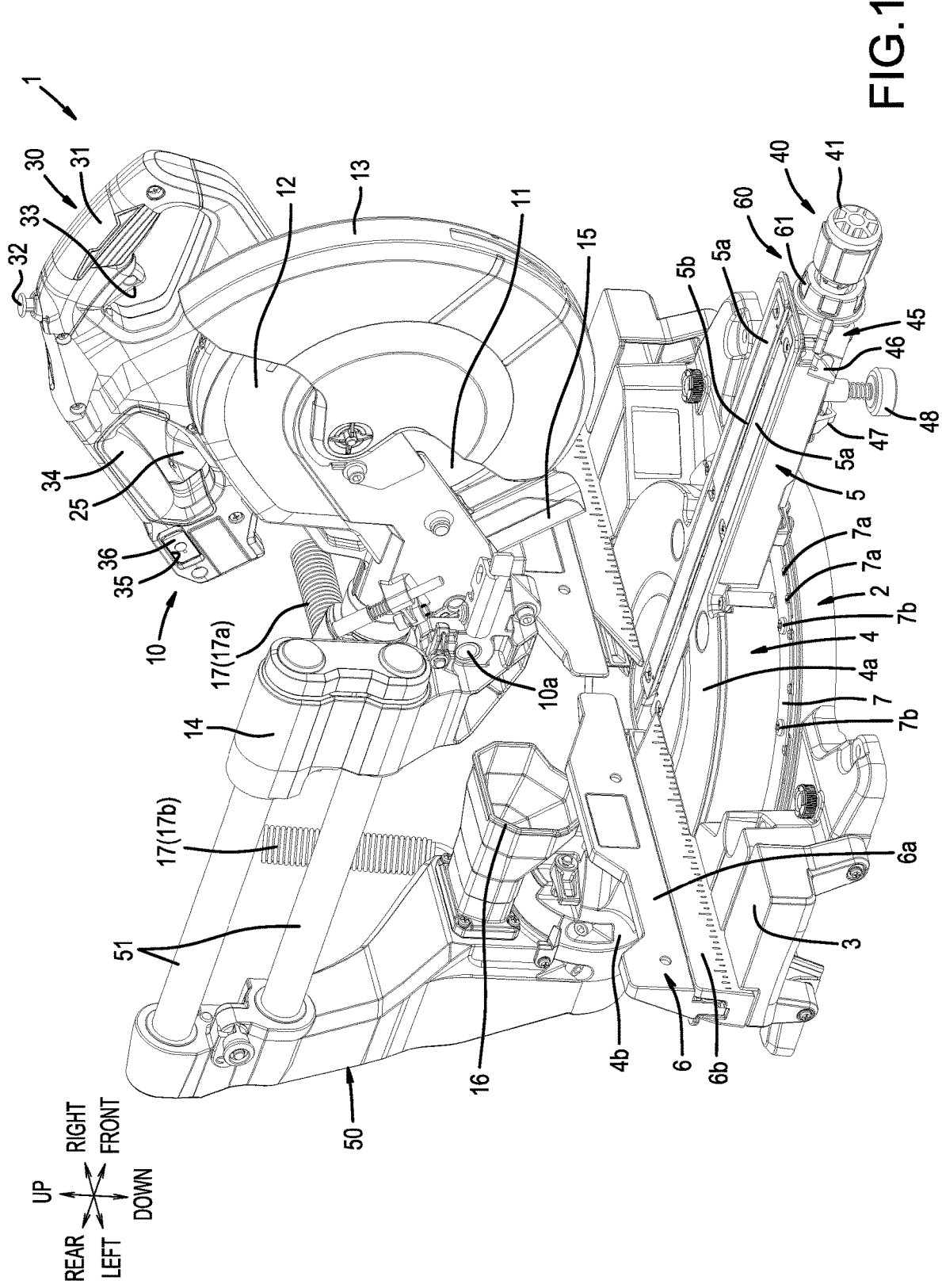
FIG. 1 is an oblique view of the entirety of a benchtop cutting machine according to a first exemplary embodiment of the present teachings.

Next, a first exemplary embodiment of the present teachings will be explained, with reference to FIGS. 1-14. The first exemplary embodiment will be referred to as a benchtop cutting machine 1, but it is also known in the art more specifically as a sliding compound miter saw. As shown in FIG. 1, the benchtop cutting machine 1 comprises: a base 2, which is placed on a bench, work stand, a floor, or the like; a turntable 4 for the workpiece to be placed upon; and a cutting-machine main body (carriage) 10. The turntable 4 is supported, such that it is rotatable in a horizontal plane, on an upper side of the base 2. Support-table parts 3 are provided on both side portions of the base 2. A cutting tool 11, which has a circular shape and may preferably be a miter saw blade, is rotatably supported on the cutting-machine main body 10. The turntable 4 comprises a table-extension part (extension arm) 5, which extends along the direction of the cutting plane of the cutting tool 11. In the explanation below, the direction in which the pair of support-table parts 3 is provided relative to the turntable 4 is defined as the left-right direction, and the side on which the table-extension part 5 is disposed is defined as the front side. A user performs cutting work while positioned (standing) on the front side of the benchtop cutting machine 1. The front-rear, up-down, and left-right directions of members and structural elements are defined with the user as a reference and are depicted accordingly in the drawings.

Figure 3:
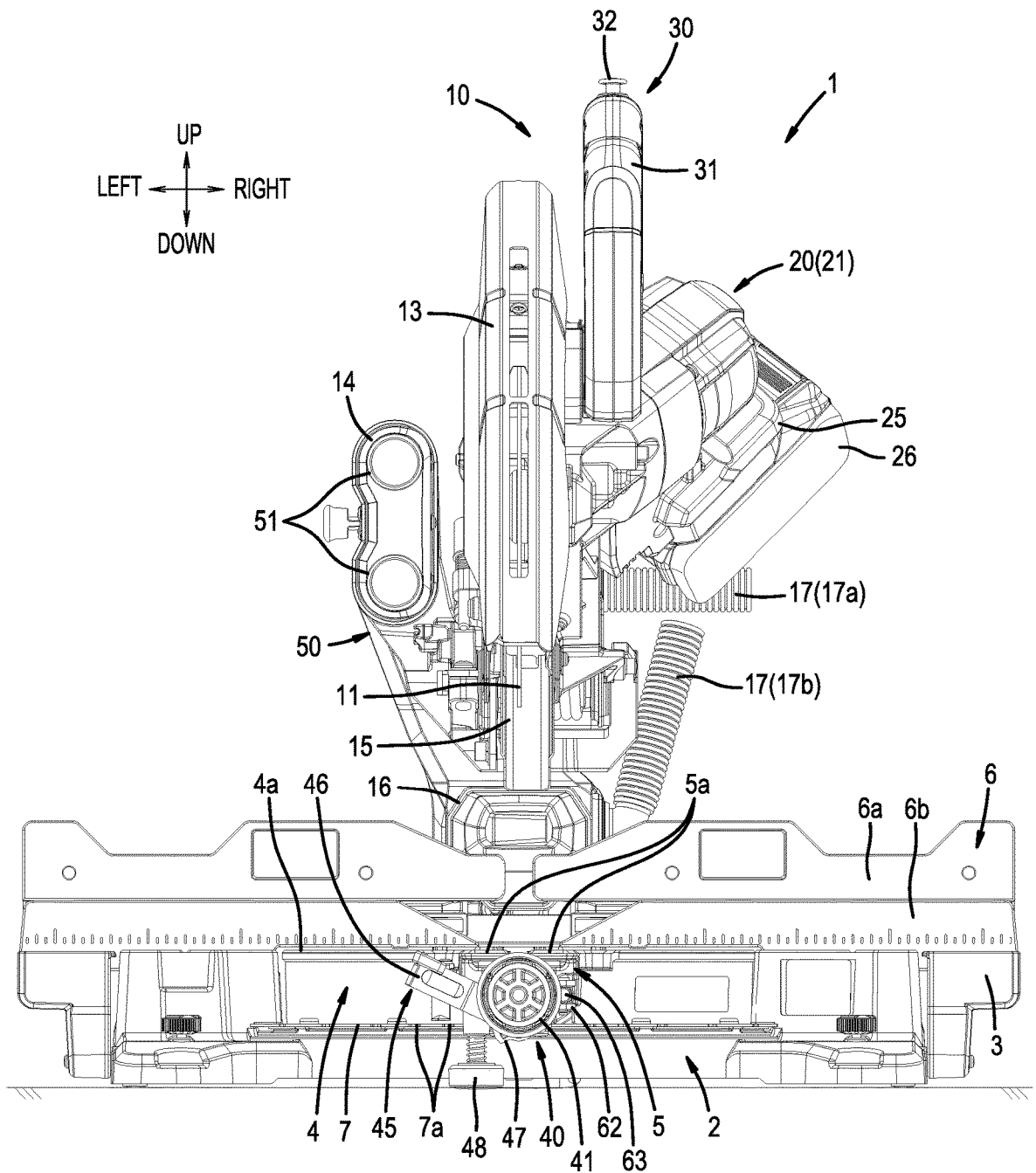
FIG. 3 is a front view of the benchtop cutting machine according to the first embodiment.
Figure 4:
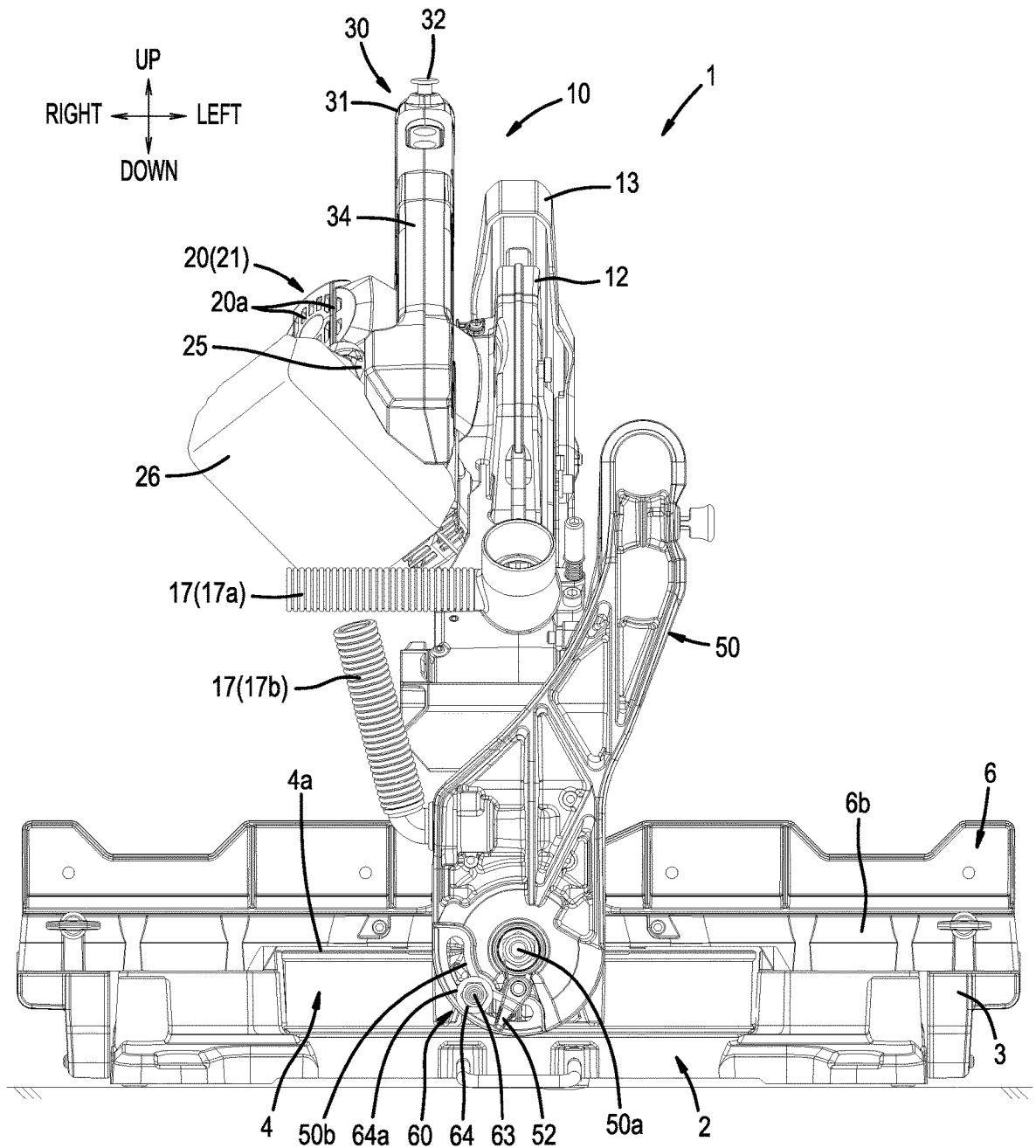
FIG. 4 is a rear view of the benchtop cutting machine according to the first embodiment and shows a right-angle-cut state in which a rotary cutting tool cuts into a workpiece at a right angle (90°).
Figure 7:
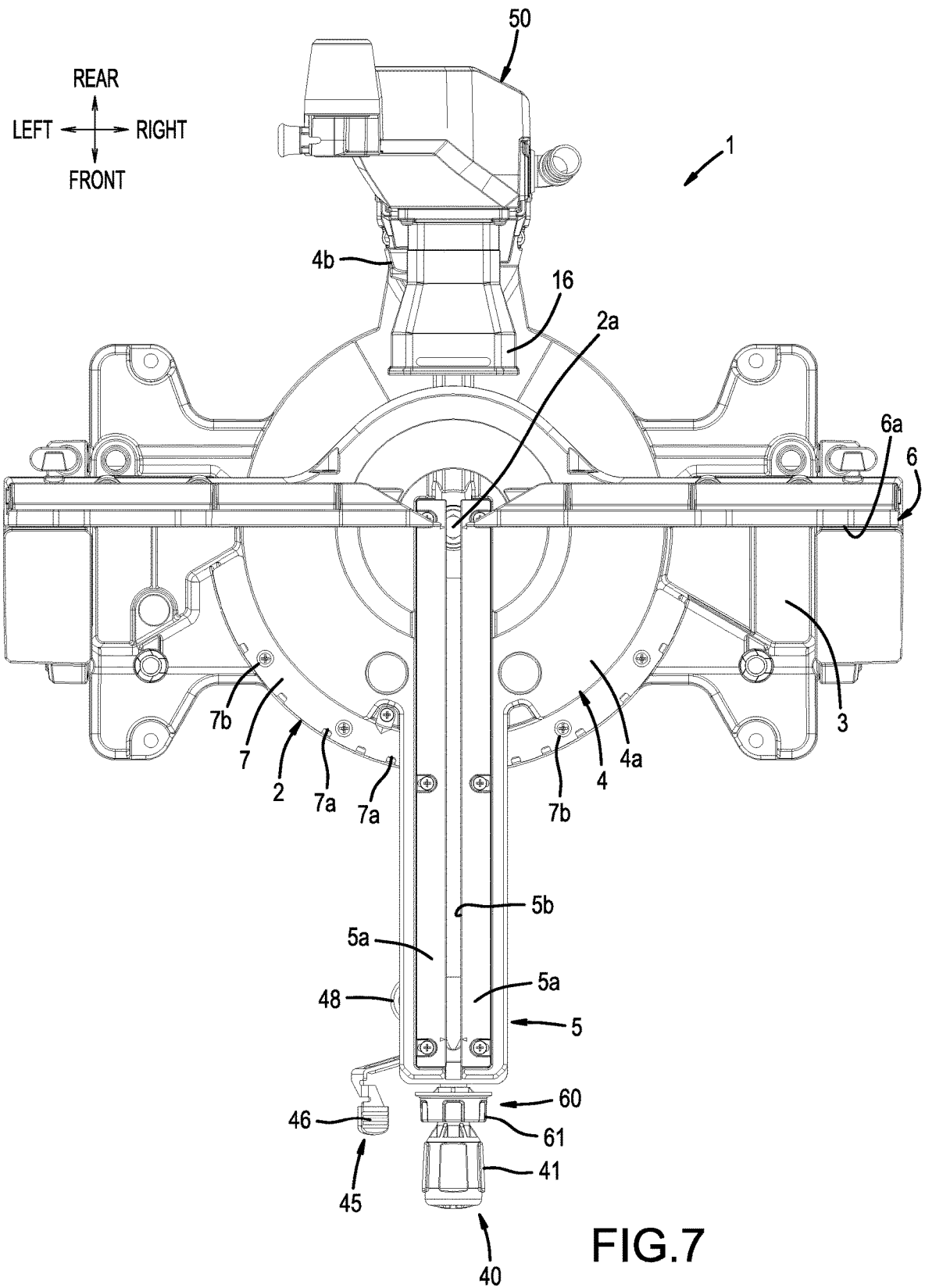
FIG. 7 is a plan view of the state in which the cutting-machine main body of the benchtop cutting machine according to the first embodiment has been removed to expose elements thereunder.

As shown in FIG. 7, the turntable 4 is rotatable about a rotary spindle 2a that is located at the center of the base 2 and serves as the center of rotation for the turntable 4. A table upper surface 4a of the turntable 4 is substantially circular-shaped in plan view. As shown in FIG. 3, the table upper surface 4a is provided (extends) in a horizontal plane. Upper surfaces of the support-table parts 3 are provided horizontally at substantially the same height as the table upper surface 4a. A kerf board or kerf boards 5a is (are) provided on the upper surface of the table-extension part 5. The kerf board(s) 5a is (are) provided horizontally at substantially the same height as the table upper surface 4a. As shown in FIG. 1, a slot 5b is provided along the center of the kerf board(s) 5a and defines a gap that extends along the cutting plane of the cutting tool 11; i.e. the slot 5b is defined so that the cutting tool 11, which may be a rotating miter saw blade, can pass through the table upper surface 4a when cutting a workpiece.

As shown in FIG. 1, an adjustment bolt 48, which supports the table-extension part 5 from below, is provided on a lower portion of the table-extension part 5. That is, the table-extension part 5 is supported by the adjustment bolt 48, which is movable up and down by rotating owing to the threaded connection with the table-extension part 5. The adjustment bolt 48 moves downward by being manipulated (rotated) in a screw-loosening direction. When a lower end of the adjustment bolt 48 abuts the surface on which the benchtop cutting machine 1 is placed, the adjustment bolt 48 supports the table-extension part 5 such that the height of the table-extension part 5 is adjustable and also reduces rattling of the table-extension part 5.

Figure 8:
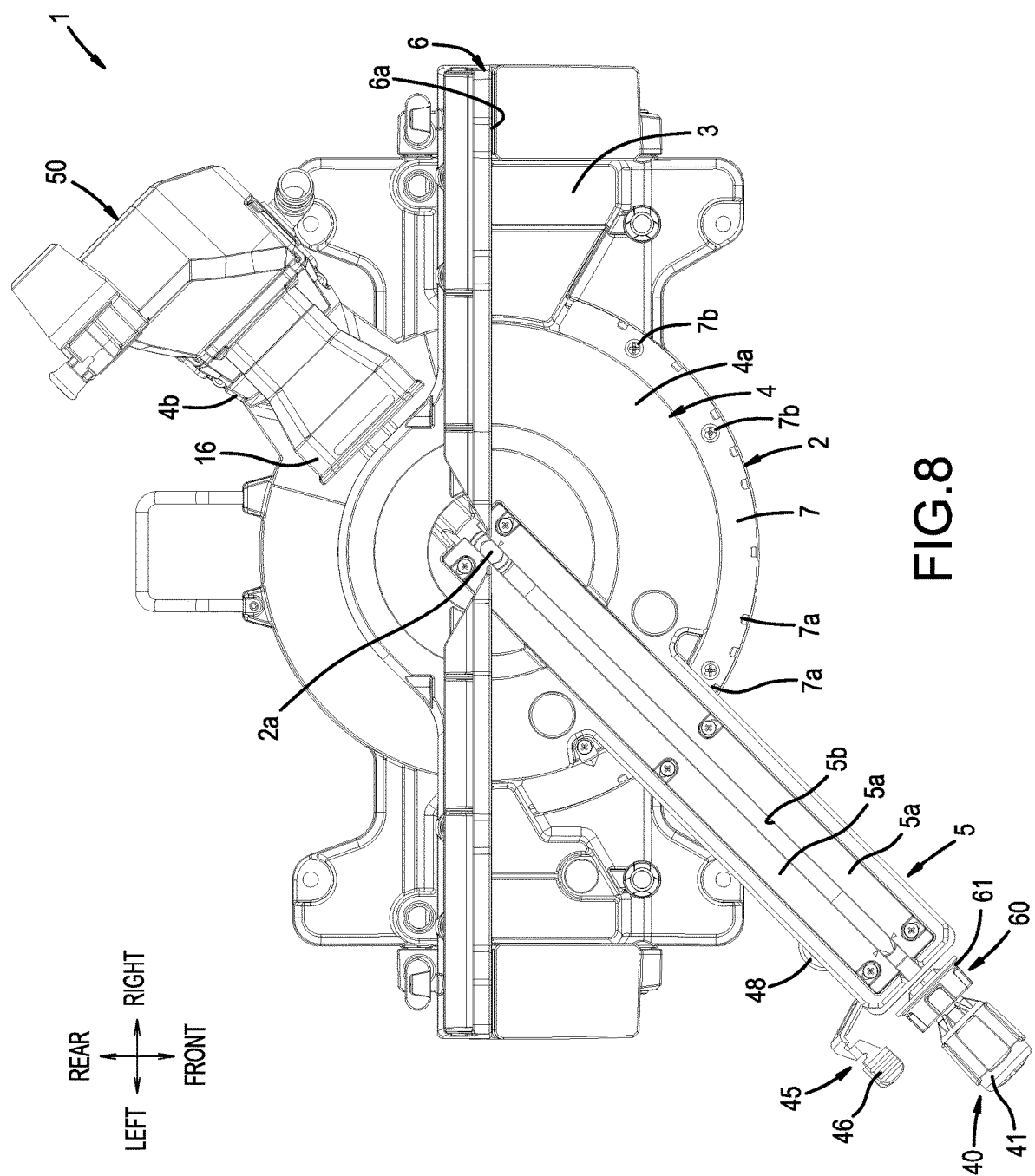
FIG. 8 is a plan view of the state in which the cutting-machine main body of the benchtop cutting machine according to the first embodiment has been removed and shows a diagonal-cut state in which a turntable has been rotated leftward to perform a miter cut.

As shown in FIG. 1, a positioning fence (guide fence) 6, which has a wall shape and extends in the left-right direction and upward, is provided on the upper side of the turntable 4 and the support-table parts 3. The positioning fence 6 is supported by a fence-base part 6b, which is supported by the support-table parts 3 and extends in the left-right direction, such that the positioning fence 6 is mountable on and demountable from the fence-base part 6b. As shown in FIGS. 7 and 8, a positioning surface 6a, which is a front surface of the positioning fence 6, lies in a vertical plane, through which the rotary spindle 2a passes. By being in contact with the positioning surface 6a, the workpiece placed on the table upper surface 4a is positioned in the front-rear direction. A miter scale plate 7, which has an arcuate shape that is centered on the rotary spindle 2a, is provided frontward of the table upper surface 4a of the base 2.

As shown in FIG. 3, the miter scale plate 7 is provided such that it extends in a horizontal plane that is downward of the table upper surface 4a. As shown in FIG. 7, a plurality of positioning recesses 7a, each of which has a groove shape and extends in a radial direction with respect to the rotary spindle 2a, is provided in the miter scale plate 7. The positioning recesses 7a are provided spaced apart at prescribed angular intervals in the circumferential direction of the miter scale plate 7. The prescribed angular intervals correspond to miter angles that are commonly used in miter cutting operations, such as 0°, 15°, 22.5°, 31.6°, 45°, and 60°. A tip portion of a positioning pin (locking pin or lock rod) 46a (refer to FIG. 10), which is further described below, is configured to be inserted into the respective positioning recesses 7a in order to lock (block) rotation of the turntable 4 relative to the base 2. As shown in FIG. 1, the miter scale plate 7 is fixed to the base 2 by fixing screws 7b. Holes, into which the fixing screws 7b are inserted, are formed as slotted holes. By loosening the fixing screws 7b and shifting the miter scale plate 7 in the left-right direction, the angle between the positioning fence 6 and the cutting tool 11 can be finely adjusted. For example, if the positioning pin 46a (refer to FIG. 10) has been inserted into the positioning recess 7a at the right-angle position, then the perpendicularity between the cutting tool 11 and the positioning fence 6 can be accurately adjusted. This adjustment is performed principally in the product-manufacturing process.

As shown in FIG. 1, an arm-support part 4b is provided at (on) a rear portion of the turntable 4. A main-body support arm 50 (main-body tilting part), which extends approximately upward, is provided on a rear side of the arm-support part 4b. The main-body support arm 50 is supported such that it is tiltable, about a clockwise-counterclockwise tilting pivot 50a (refer to FIG. 4) extending in the front-rear direction, in the clockwise-counterclockwise direction relative to the arm-support part 4b in order to set the bevel angle of the cutting tool 11. A pair of up and down slide bars 51, which extend forward, is provided at an upper portion of the main-body support arm 50. The slide bars 51 extend along the direction in which the table-extension part 5 extends. A main-body support part (slider) 14, which is coupled to the cutting-machine main body 10, is mounted, such that it is slidable in the front-rear direction, on the slide bars 51. By sliding the main-body support part 14 in the front-rear direction relative to the turntable 4, a wide workpiece (i.e. wider than the diameter of the cutting tool 11) placed on the table upper surface 4a can be cut.

As shown in FIG. 1, the cutting tool 11 is rotatably mounted on the cutting-machine main body 10 such that its cutting plane extends in the front-rear direction, i.e. along the longitudinal extension of the table-extension part 5. The cutting-machine main body 10 comprises an up-down pivot support rod 10a, which is rearward of the cutting tool 11. The axial direction of the up-down pivot support rod 10a extends in the left-right direction. Therefore, the cutting-machine main body 10 is pivotable in the up-down direction, centered at the up-down pivot support rod 10a. By pivoting the cutting-machine main body 10 downward, the cutting tool 11 can cut into and through the workpiece placed on the table upper surface 4a.

Figure 5:
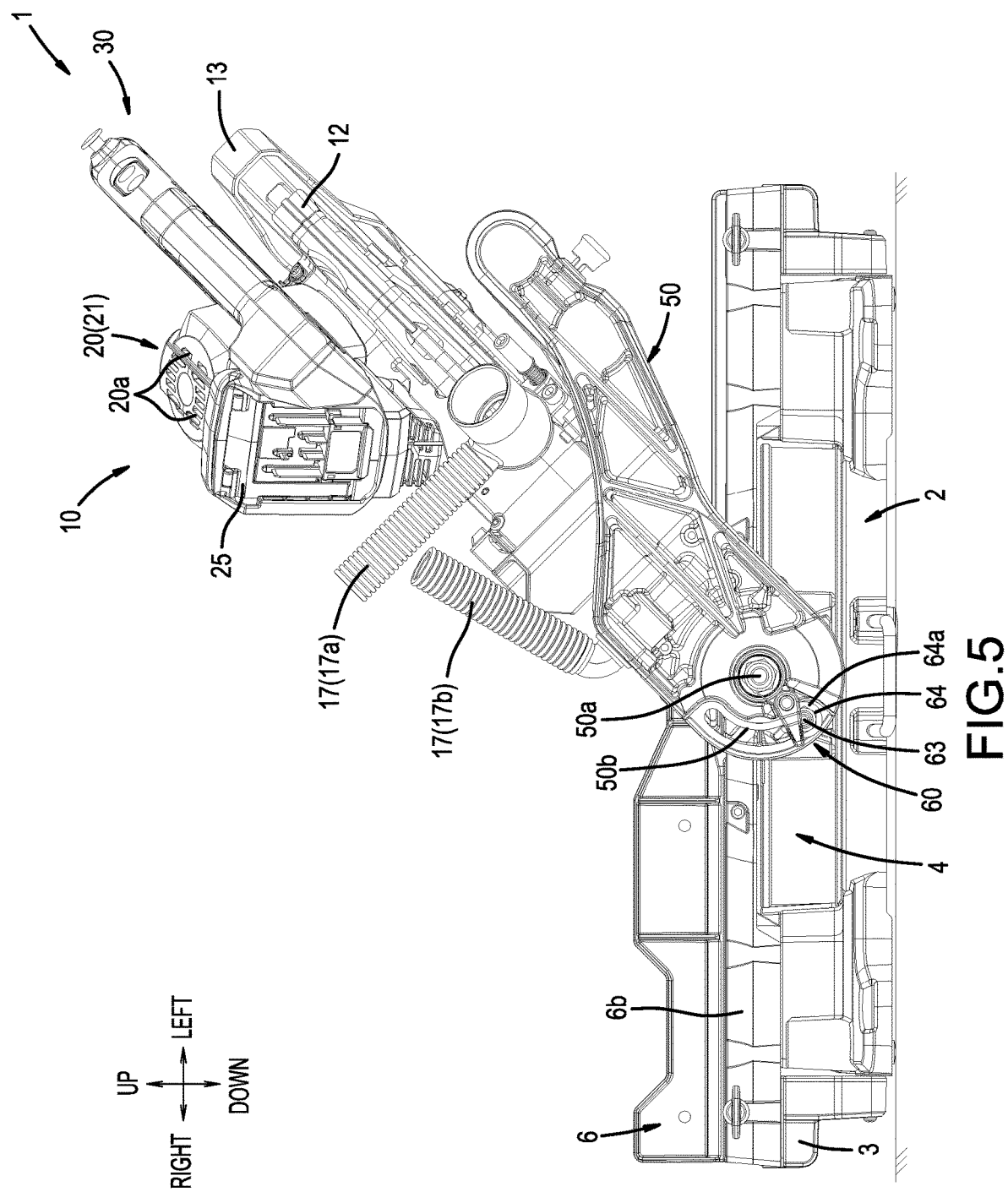
FIG. 5 is a rear view of the benchtop cutting machine according to the first embodiment and shows a bevel-cut state in which a cutting-machine main body has been tilted counterclockwise to perform a bevel cut.
Figure 6:
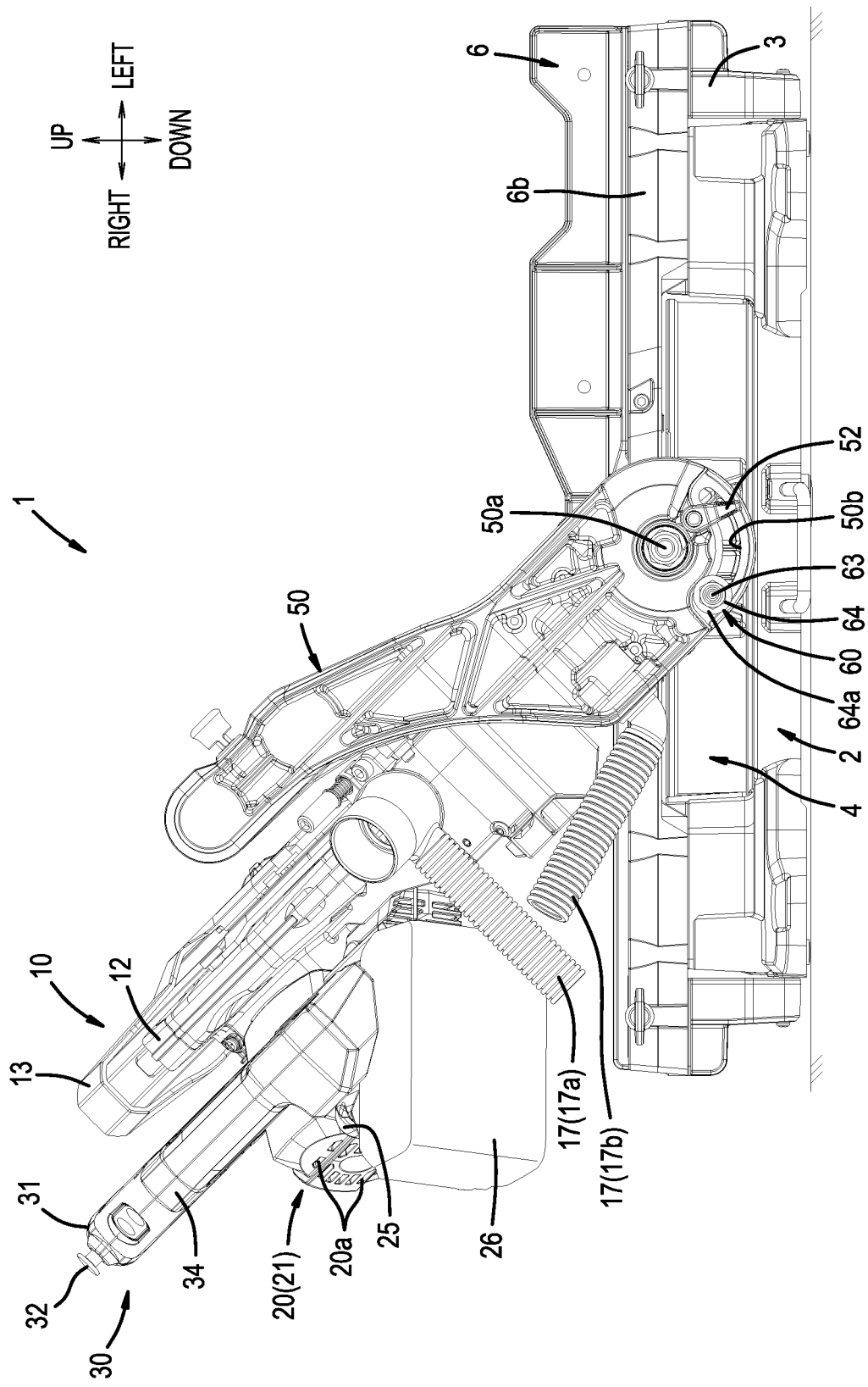
FIG. 6 is a rear view of the benchtop cutting machine according to the first embodiment and shows a bevel-cut state in which the cutting-machine main body has been tilted clockwise to perform a bevel cut.

As shown in FIGS. 5 and 6, by tilting the main-body support arm 50 in the clockwise and counterclockwise directions, the cutting tool 11 (refer to FIG. 3), which is provided on the cutting-machine main body 10, can be tilted in both the clockwise and counterclockwise directions up to, for example, 45°. Thereby, a so-called bevel cut can be performed on the workpiece placed on the table upper surface 4a (refer to FIG. 4). A maximum-tilt-angle changing lever 52 is provided on a rear-side lower portion of the main-body support arm 50. The maximum-tilt angle of the cutting tool 11 in the clockwise and counterclockwise directions can be changed by manipulating (rotating) the maximum-tilt-angle changing lever 52. For example, the cutting tool 11 can be tilted in the clockwise and counterclockwise directions up to a maximum of approximately 48°. An arcuate hole 50b, which passes through in the front-rear direction and has an arcuate shape that is centered on the clockwise-counterclockwise tilting pivot 50a, is provided in a lower portion of the main-body support arm 50. A transmission shaft 63 (described below) protrudes, forward to rearward, beyond the arcuate hole 50b.

As shown in FIG. 1, the cutting-machine main body 10 comprises a fixed blade cover (blade guard) 12 and a movable blade cover (blade guard) 13. The fixed blade cover 12 covers an upper-side, half-circumference portion of the cutting tool 11. The movable blade cover 13 is configured to cover a lower-side, half-circumference portion of the cutting tool 11. The movable blade cover 13 rotates interlinked with the up and down pivoting of the cutting-machine main body 10 and thereby opens and closes (exposes and covers) the lower-side half circumference of the cutting tool 11. When the cutting-machine main body 10 has been tilted upward, the movable blade cover 13 rotates in the closed-position direction (clockwise direction in FIG. 1) and thereby covers the lower-side, half-circumference portion of the cutting tool 11. When the cutting-machine main body 10 is tilted downward, the movable blade cover 13 rotates in the open-position direction (counterclockwise direction in FIG. 1) and thereby exposes the lower-side, half-circumference portion of the cutting tool 11. Thereby, the workpiece placed on the table upper surface 4a can be cut by the exposed cutting tool 11.

As shown in FIG. 1, a dust-collecting guide 15 is provided on a lower side of a rear portion of the fixed blade cover 12. In an attitude in which the cutting-machine main body 10 has been moved to a lower-end position, the dust-collecting guide 15 has a wall shape that is standing in the up-down direction and is substantially C-shaped in plan view. A front side of the substantially C-shaped dust-collecting guide 15 is open. The dust-collecting guide 15 reduces the scattering of chips, dust, etc., which are produced by cutting the workpiece, rearward and to both the left and the right sides of the cutting tool 11. An upper portion of the dust-collecting guide 15 fluidly communicates with a first dust-collecting hose 17a, which extends rightward from the rear portion of the cutting-machine main body 10.

Figure 2:
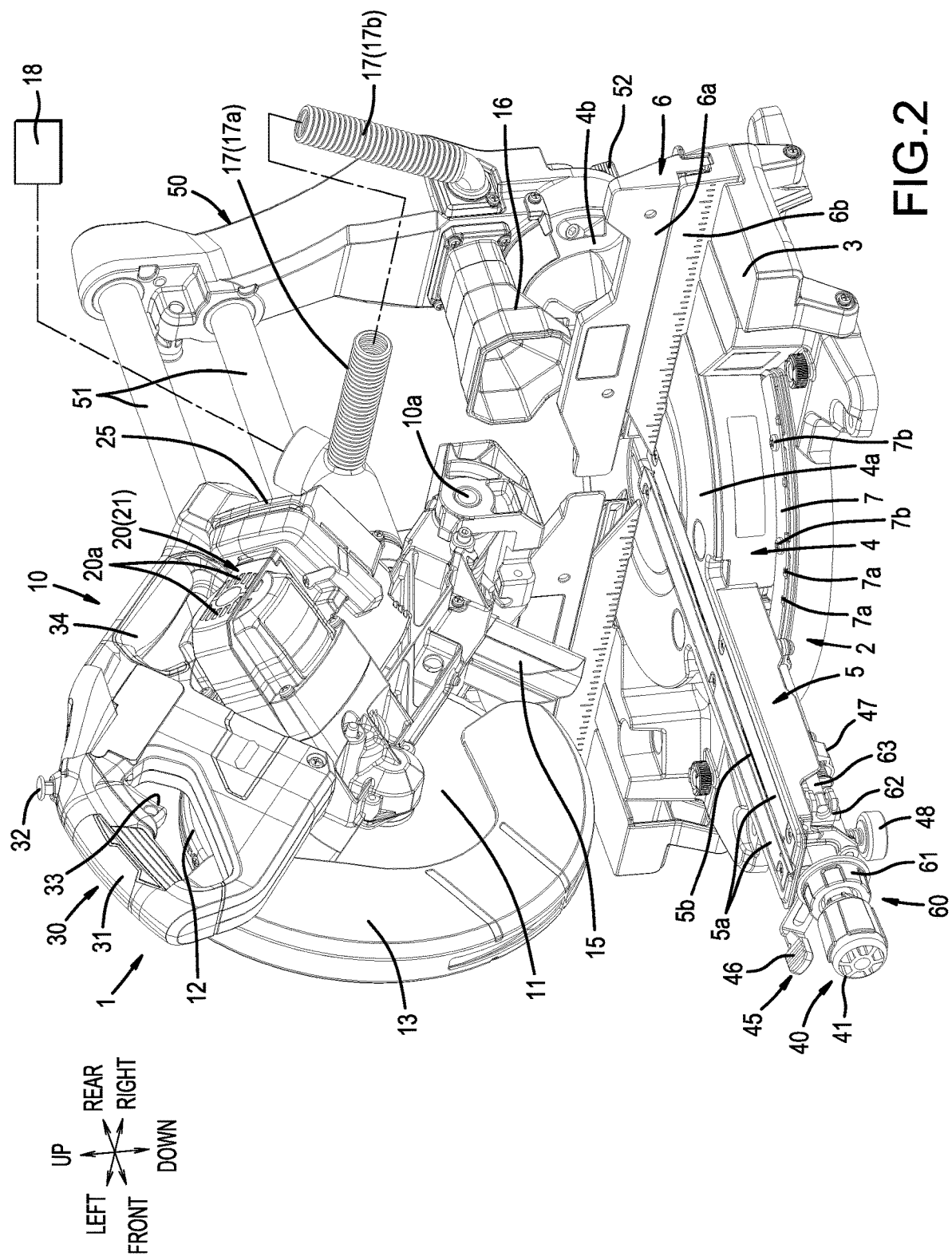
FIG. 2 is an oblique view of the entirety of the benchtop cutting machine according to the first embodiment.

As shown in FIG. 1, a rear-portion, dust-collection opening 16, which has a tube shape that is open forward, is provided on a front portion of the main-body support arm 50. The rear-portion, dust-collection opening 16 reduces the scattering of chips, dust, etc. further rearward of the dust-collecting guide 15. A rear portion of the rear-portion, dust-collection opening 16 fluidly communicates with a second dust-collecting hose 17b, which extends rightward from the main-body support arm 50. As shown in FIG. 2, the dust-collecting hoses 17 (i.e. 17a and 17b) are fluidly connectable with a dust collector (dust extractor) 18, which is separate from the benchtop cutting machine 1. By starting the dust collector 18, chips, dust, etc., that have scattered around the dust-collecting guide 15 and the rear-portion, dust-collection opening 16 can be suctioned into the dust collector 18 via the dust-collecting hoses 17a, 17b.

As shown in FIG. 2, the cutting-machine main body 10 comprises a motor housing 20 and a handle 30. The motor housing 20 and the handle 30 are provided on the right side of the fixed blade cover 12 and the movable blade cover 13. The motor housing 20 is substantially circular-cylinder-shaped and is tilted upward to the right relative to the fixed blade cover 12. Air-suction ports 20a, which are designed for intaking outside air into the motor housing 20, are provided in an upper-right portion of the motor housing 20. An electric motor 21 is housed in the motor housing 20 such that its motor shaft is oriented in a longitudinal direction of the motor housing 20, which is substantially circular-cylinder-shaped. For example, a DC brushless motor is used as the electric motor 21.

The cutting tool 11 shown in FIG. 3 is integrally mounted on (detachably affixed to) a spindle (not shown), which extends in the left-right direction and is rotatably supported by the cutting-machine main body 10. A speed-reducing gear part (gear train) is interposed (operably coupled) between the spindle and the motor shaft of the electric motor 21. The rotation of the motor shaft is transmitted to the spindle via the speed-reducing gear part, and thereby the cutting tool 11 rotates.

As shown in FIG. 3, when the cutting tool 11 has been positioned at a right-angle cutting position, which is orthogonal to the upper surface of the turntable 4, the motor housing 20 is disposed with an attitude in which it is tilted upward to the right instead of being parallel to the upper surface of the turntable 4. In this orientation, the cutting tool 11 cuts in a vertical plane. Furthermore, the angle at which the cutting-machine main body 10 can be tilted in the clockwise and counterclockwise directions can be made larger in the clockwise direction because the cutting-machine main body 10 is tilted upwardly and does not interfere with the table upper surface 4a until the cutting-machine main body 10 is much closer to the table upper surface 4a. That is, compared with a configuration in which the motor housing 20 is disposed parallel to the upper surface of the turntable 4, the cutting-machine main body 10 can be tilted more greatly in the clockwise direction.

As shown in FIG. 2, a battery-mount part 25 is provided rearward of the motor housing 20. A mount surface of the battery-mount part 25 faces rearward and extends generally along the longitudinal direction of the motor housing 20. As shown in FIG. 3, a battery (battery pack, battery cartridge) 26 can be mounted on the battery-mount part 25 by being slid along the longitudinal direction of the motor housing 20. The outer housing (case) of the battery 26 is substantially rectangular-box-shaped. The battery 26 contains, for example, a plurality of lithium-ion battery cells having a total output voltage, e.g., of 36 V. The battery 26 is repeatedly chargeable and can be removed from the battery-mount part 25 to be charged by a separate charger. The battery 26 can be designed to be shared as a power supply with other rechargeable-type power tools such as screwdrivers, electric drills, and the like.

As shown in FIG. 1, a main handle 31, which has a loop shape extending in the front-rear direction, is provided on a front portion of the handle 30. A switch lever (trigger) 33 is provided on an inner-circumference side of the main handle 31. The switch lever 33 is provided such that, when the user grasps the main handle 31, the user can hook a finger onto and pull the switch lever 33. When the switch lever 33 is pulled, the electric motor 21 starts, and thereby the cutting tool 11 rotates. A lock-off button (lock-off lever) 32 is provided on an upper portion of the main handle 31. When the lock-off button 32 is pushed, pulling (operation) of the switch lever 33 is enabled. Thereby, an unintentional startup of the electric motor 21 is avoided.

As shown in FIG. 1, the handle 30 also comprises a carrying handle 34, which is rearward of the main handle 31. The carrying handle 34 has a loop shape that, in the state in which the cutting-machine main body 10 has been moved (pivoted) to its lowered position, extends in the front-rear direction and generally in the horizontal direction. When the cutting-machine main body 10 is locked at its lowered position, the user can carry the benchtop cutting machine 1 by grasping the carrying handle 34.

As shown in FIG. 1, the handle 30 also comprises an adapter mounting part 35, which has a recessed shape and is disposed rearward of the carrying handle 34. A wireless communication adapter 36 can be inserted into and thereby mounted on the adapter mounting part 35. The wireless communication adapter 36 is configured to enable wireless communication between the benchtop cutting machine 1 and other accessory equipment. For example, a startup operation, a stop operation, or the like of the benchtop cutting machine 1 and the accessory equipment can be linked by the wireless communication. The benchtop cutting machine 1 and, for example, the dust collector 18 (refer to FIG. 2), which is separate from the benchtop cutting machine 1 but fluidly connected thereto, can be linked by the wireless communication adapter 36 so that the dust collector 18 turns ON and starts suctioning when the benchtop cutting machine 1 is turned ON and turns OFF to stop the suctioning when the benchtop cutting machine 1 is turned OFF. Therefore, in such an embodiment, the user is not required to separately control the operation of the dust collector 18.

Figure 9:
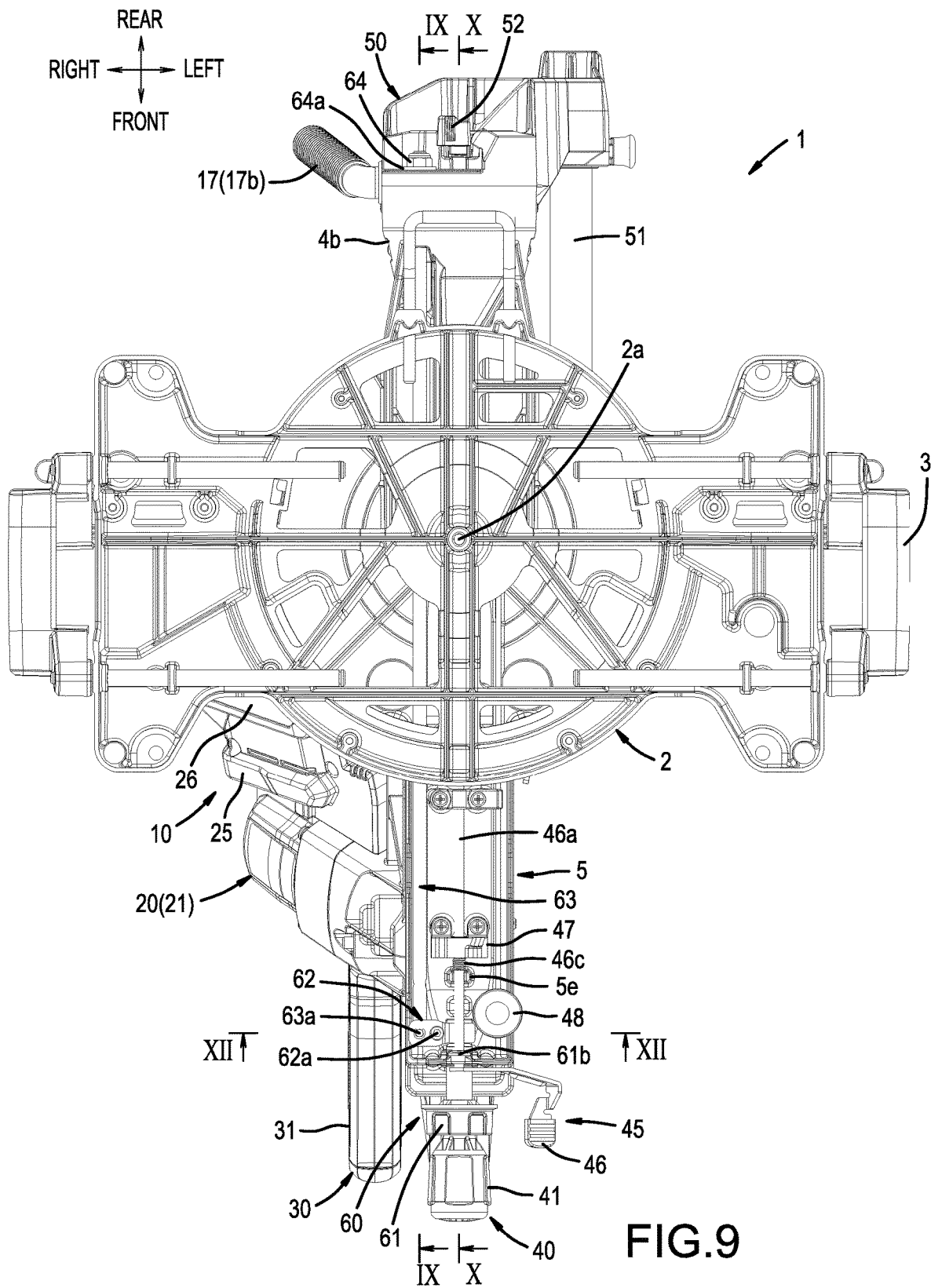
FIG. 9 is a bottom view of the benchtop cutting machine according to the first embodiment.
Figure 10:
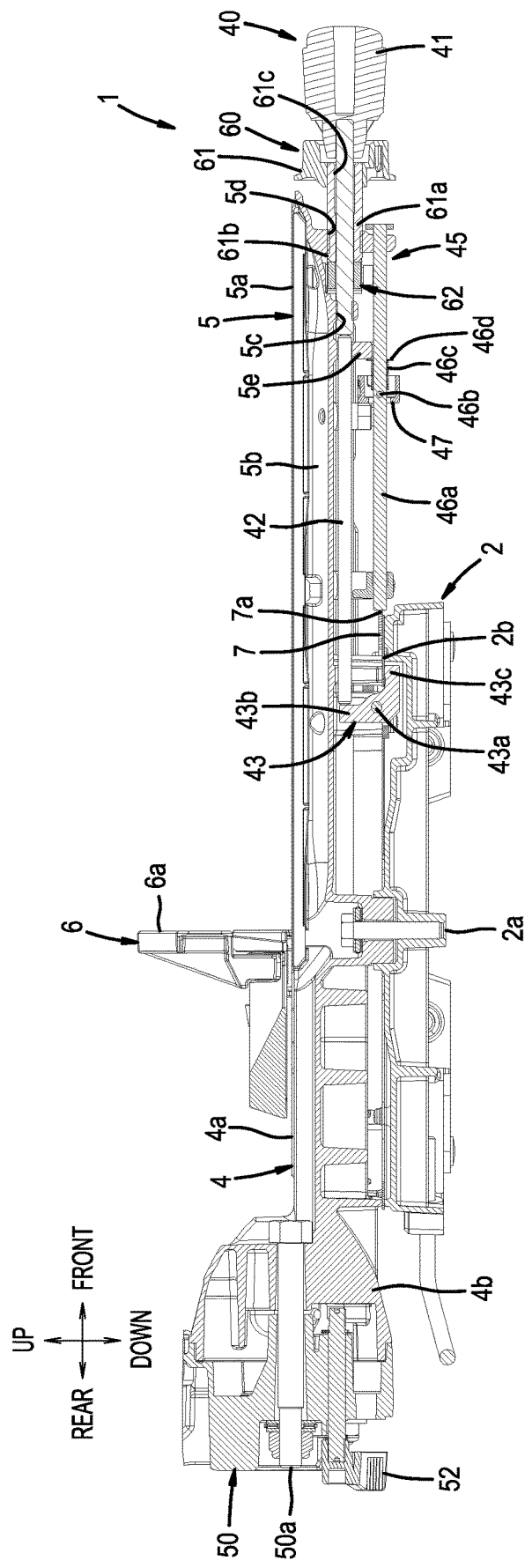
FIG. 10 is a cross-sectional oblique view taken along line X-X in FIG. 9 and is a longitudinal, cross-sectional view of a lower portion of the benchtop cutting machine according to the first embodiment.
Figure 12:
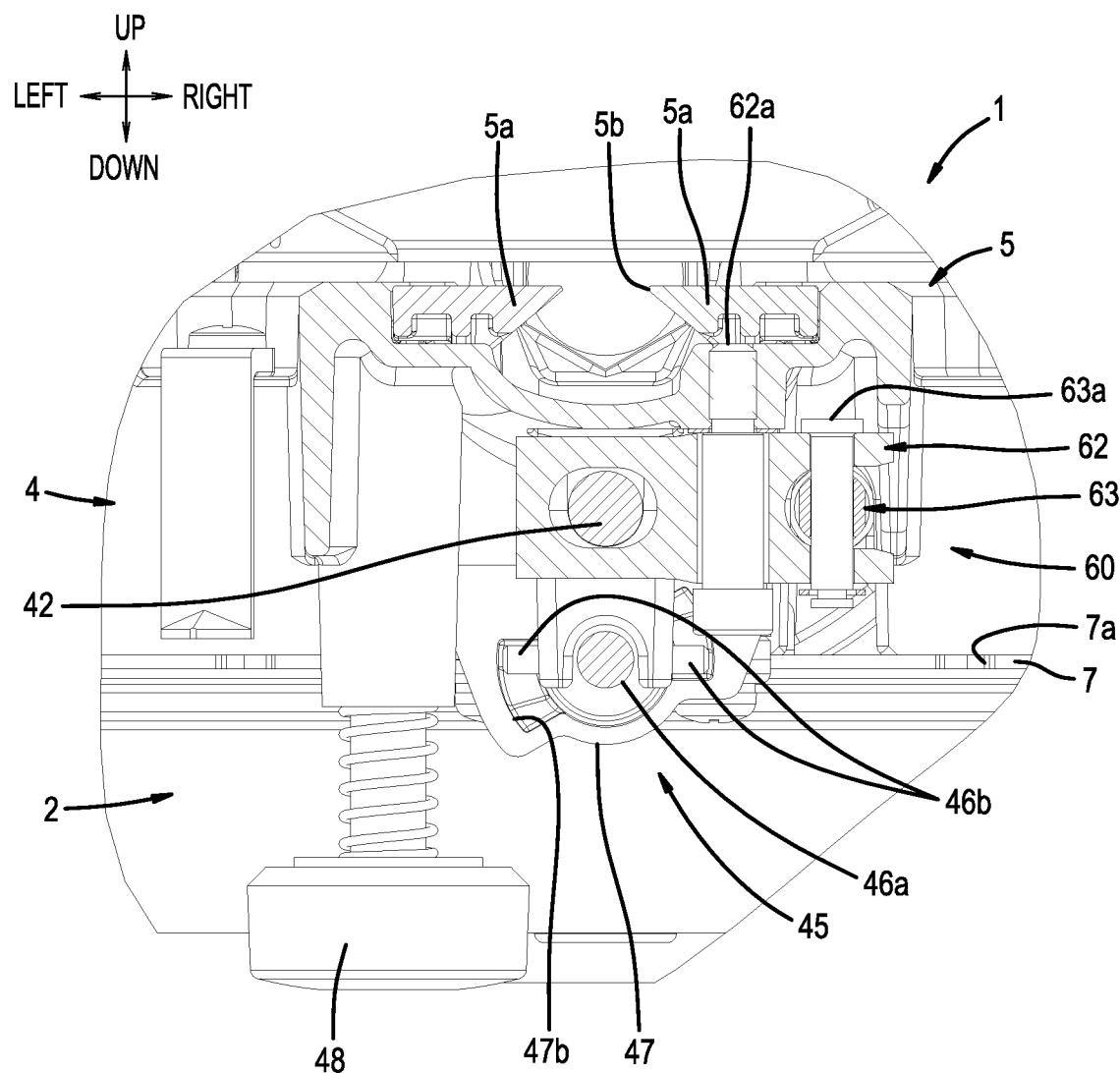
FIG. 12 is a cross-sectional oblique view taken along line XII-XII in FIG. 9 and is a longitudinal, cross-sectional view of a table-extension part according to the first embodiment.

As shown in FIG. 2, a turntable-fixing mechanism (miter angle locking mechanism) 40 and a positive-lock mechanism (miter angle positive-stop mechanism) 45 are provided on (in) a lower portion of the table-extension part 5. As shown in FIG. 10, the turntable-fixing mechanism 40 comprises a grip (knob) 41 (turntable-fixing manipulatable part) and a fixing rod (locking pin or locking rod) 42 (turntable-fixing member). The fixing rod 42 extends in the longitudinal direction (front-rear direction) of the table-extension part 5. As shown in FIG. 12, the fixing rod 42 is disposed at the center of the interior of the table-extension part 5 in the left-right direction. Although not explicitly shown in the drawings, a male thread is defined on at least a portion of the outer circumference of the fixing rod 42. Therefore, as shown in FIG. 10, the fixing rod 42 is supported by screwing its threaded portion into a screw hole 5c, which is provided in the interior of the table-extension part 5 and has a matching female thread. A front portion of the fixing rod 42 protrudes forward beyond a front surface of the table-extension part 5. The grip 41 is integrally coupled to the front portion of the fixing rod 42 so that the grip 41 and the fixing rod 42 integrally rotate together. As shown in FIGS. 9 and 10, the grip 41 is disposed at the center of the table-extension part 5 in the left-right direction forward of the front surface of the table-extension part 5 such that the outer circumference of the grip 41 does not protrude upward of the upper surface of the table-extension part 5. A concave-convex shape (e.g., alternating ridges and grooves) is provided on the outer circumference of the grip 41 such that the user can securely grasp and manually rotate the grip 41 about the rotational axis of the fixing rod 42 that is threadably inserted into the screw hole 5c. Therefore, when the user grasps the grip 41 and manually rotates it about the rotational axis of the fixing rod 42, the fixing rod 42 rotates integrally with the grip 41. Thus, when the fixing rod 42 is rotated about its axis, the fixing rod 42 displaces (moves) in the front-rear direction owing to the threaded connection with the stationary screw hole 5c.

As shown in FIG. 10, the base 2 comprises a slide plate (horizontal-plate part) 2b, which extends in the horizontal direction toward the rotary spindle 2a at substantially the same height as the miter scale plate 7. A turn stopper (sandwiching member or clamping member) 43 is provided at a rear side of the fixing rod 42. The turn stopper 43 is substantially L-shaped when viewed from the left-right direction. In the vicinity of a bent portion of the shape that is substantially L-shaped, the turn stopper 43 is provided with a pivot shaft (pivot pin) 43a, which extends in the left-right direction. Therefore, the turn stopper 43 is supported, pivotably about the pivot shaft 43a, by the table-extension part 5. The turn stopper 43 has, at one end of the L shape, a rod-abutting part 43b, which is configured to abut a rear end of the fixing rod 42, and has, at the other end of the L shape, a sandwiching part (clamping part) 43c, which is configured to abut (press against) a lower surface of the slide plate 2b.

When the fixing rod 42 is displaced rearward (by rotating the grip 41) and abuts (presses against) the rod-abutting part 43b, the rod-abutting part 43b is pressed rearward. This causes the turn stopper 43 to pivot about the pivot shaft 43a, so that the sandwiching part 43c is displaced upward and abuts (presses against) the lower surface of the slide plate 2b, thereby sandwiching (clamping) the slide plate 2b between the sandwiching part 43c and the table-extension part 5. As a result, the table-extension part 5 and the turn stopper 43 become unmovable in the left-right direction relative to the slide plate 2b. Accordingly, the table-extension part 5 and the turntable 4, which is integral with the table-extension part 5, are rotationally locked with respect to the base 2.

On the other hand, when the fixing rod 42 is displaced forward (by rotating the grip 41 in the opposite rotational direction), the force that pushes the rod-abutting part 43b rearward becomes small (or ceases). Therefore, the turn stopper 43 pivots about the pivot shaft 43a in the opposite direction, so that the sandwiching part 43c displaces downward and releases (loosens) the sandwiching (clamping) of the slide plate 2b between the turn stopper 43 and the table-extension part 5. As a result, the table-extension part 5 and the turn stopper 43 become movable in the left-right direction relative to the slide plate 2b. Accordingly, when the grip 41 is rotated to displace the fixing rod 42 in the forward direction (i.e. towards the user), the table-extension part 5 and the turntable 4 are rotatable about the rotary spindle 2a relative to the base 2.

Figure 14:
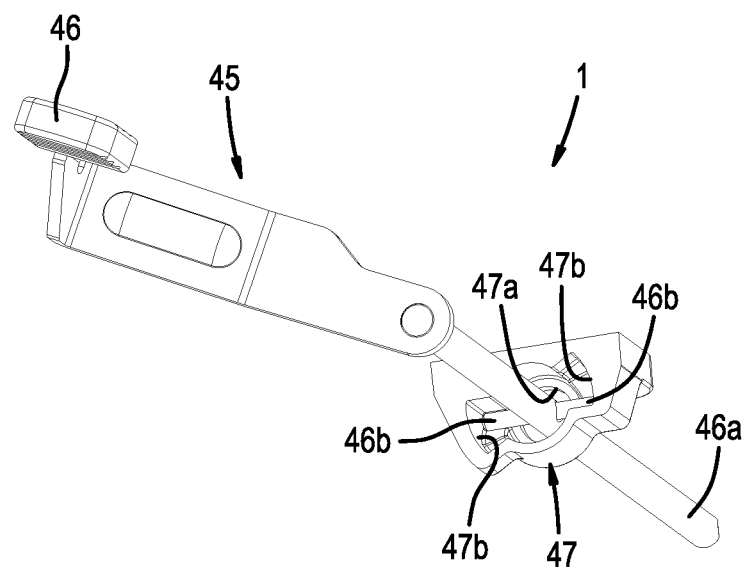
FIG. 14 is an oblique view of the positive-lock mechanism according to the first embodiment.

As shown in FIG. 9, the positive-lock mechanism 45 comprises a lock-release lever 46 and the positioning pin (locking pin or lock rod) 46a. The lock-release lever 46 is disposed forward of the front surface of the table-extension part 5 and is disposed leftward of the grip 41 and leftward of a tilt-fixing manipulatable part (knob) 61, which is further described below. As shown in FIG. 10, the positioning pin 46a is provided downward of the fixing rod 42 and extends in the front-rear direction along the longitudinal direction of the fixing rod 42, i.e. the positioning pin 46a and the fixing rod 42 extend in parallel to each other. As shown in FIG. 10, both a front portion and a rear portion of the positioning pin 46a are slidably supported by the lower portion of the table-extension part 5. The positioning pin 46a is both rotatable about its axis and is capable of being displaced (slid) in the front-rear direction. The positioning pin 46a is provided at substantially the same height as the miter scale plate 7. A tip portion (rear-end portion) of the positioning pin 46a is configured to be inserted into the respective positioning recesses 7a in order to engage the respective positioning recess 7a and fix the turntable 4 at one of the prescribed miter angles defined by the positioning recesses 7a. As shown in FIG. 14, a front end of the positioning pin 46a is coupled to a base portion of the lock-release lever 46. The lock-release lever 46 is manipulatable (manually movable) in the up-down direction such that it pivots about the rotational (longitudinal) axis of the positioning pin 46a.

As shown in FIG. 2, a pin-support part 47 is mounted on the lower portion of the table-extension part 5. As shown in FIG. 14, the pin-support part 47 comprises a through hole 47a, which passes through in the front-rear direction, and a pair of guide surfaces (lead-surface parts) 47b, which are provided (defined) laterally of the through hole 47a. The guide surfaces 47b are provided (defined) such that they have point symmetry with respect to the center of the through hole 47a. The guide surfaces 47b each have a circular sector shape in which, viewed from the front, the center of the through hole 47a serves as the arc center. One circumferential end of the circular sector shape of each of the guide surfaces 47b is located more forward than the other (opposite) circumferential end of the respective guide surface 47b. Therefore, each of the guide surfaces 47b (i.e. between the opposite circumferential ends of each guide surface 47b) is helical-shaped (sloped). Referring to the left-side guide surface 47b shown in FIG. 14, the left-side guide surface 47b slopes in the up-down direction such that the lower-side end of the circular sector shape is located forward, and the upper-side end of the circular sector shape is located rearward. Referring to the right-side guide surface 47b shown in FIG. 14, the right-side guide surface 47b slopes in the up-down direction such that the lower-side end of the circular sector shape is located rearward, and the upper-side end of the circular sector shape is located forward.

Still referring to FIG. 14, a pair of engaging pins 46b is provided on a portion of the positioning pin 46a that is substantially the center thereof in the front-rear direction. The engaging pins 46b extend in opposite directions orthogonal to the axial direction (rotational axis) of the positioning pin 46a. The engaging pins 46b are disposed (arranged) such that, in the state in which the positioning pin 46a passes through the through hole 47a, the engaging pins 46b respectively enter the two circular sectors defining the pair of guide surfaces 47b. Tip portions of the two engaging pins 46b respectively abut the two guide surfaces 47b so as to be slidable along the respective guide surfaces 47b.

Figure 13:
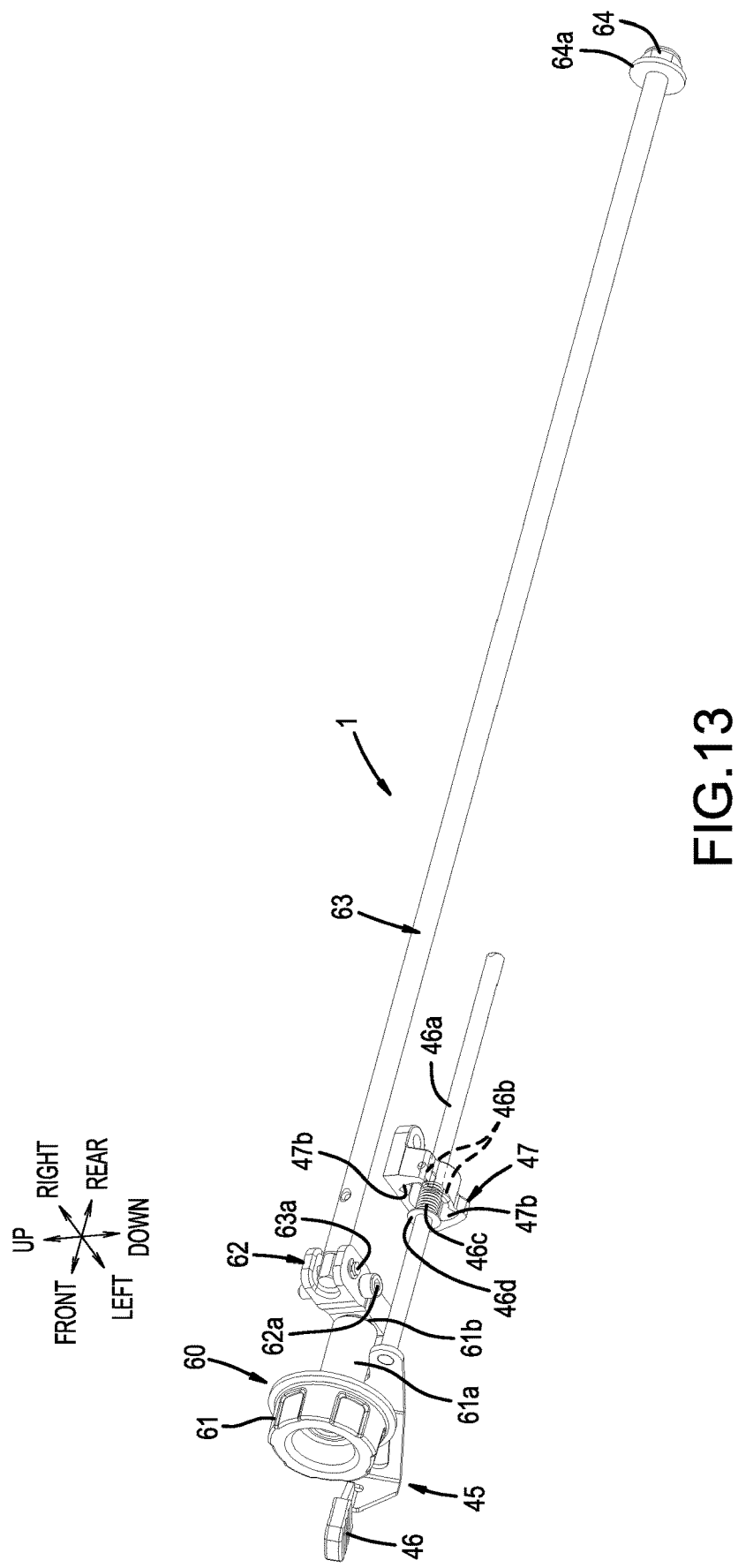
FIG. 13 is an oblique view of a tilt-fixing mechanism and a positive-lock mechanism according to the first embodiment.

As shown in FIG. 13, the positioning pin 46a is biased by a compression spring 46c that is provided on the front side of the engaging pins 46b. A washer 46d is further provided on the front side of the compression spring 46c. As shown in FIG. 10, a front surface of the washer 46d abuts a spring seat 5e, which is provided on a lower portion of the table-extension part 5. Forward movement of the front end of the compression spring 46c is restricted (blocked) by the spring seat 5e.

Referring now to FIGS. 13 and 14, the lock-release lever 46 is manipulated to release the positioning pin 46a from engagement with one of the positioning recesses 7a by being pushed downward. When the lock-release lever 46 is pushed downward, the engaging pins 46b rotate counterclockwise about the rotational axis (longitudinal direction) of the positioning pin 46a. More specifically, the tip portions of the engaging pins 46b rotate while maintaining the state in which they contact the respective guide surfaces 47b owing to the rearward biasing force of the compression spring 46c. Consequently, because the guide surfaces 47b are sloped (helical-shaped) in the up-down direction as described above, the engaging pins 46b are displaced forward along the helical-shaped guide surfaces, which are tilted forward. Accordingly, the positioning pin 46a, which is integral with the engaging pins 46b, is displaced forward against the biasing force of the compression spring 46c. This means that, as shown in FIG. 10, the rear-end tip portion of the positioning pin 46a is displaced forward and thus is shifted (slid) to a position in the front-rear direction at which the tip portion of the positioning pin 46a will not engage with any of the positioning recesses 7a. Accordingly, if the grip 41 is manually rotated in this state to release the rotationally locked state of the turntable 4 held by the turntable-fixing mechanism 40, the turntable 4 can be freely rotated (turned) in the left-right direction relative to the base 2.

To engage the tip portion of the positioning pin 46a in one of the positioning recesses 7a, the lock-release lever 46 is manipulated by being pulled upward from its downward (lock release) position. When the lock-release lever 46 is moved upward, the engaging pins 46b rotate clockwise about the axis of the positioning pin 46a. More specifically, the tip portions of the engaging pins 46b rotate while maintaining the state in which they contact the respective guide surfaces 47b owing to the rearward biasing force of the compression spring 46c. Consequently, the engaging pins 46b are displaced rearward along those guide surfaces 47b. Accordingly, the positioning pin 46a, which is integral with the engaging pins 46b, is displaced rearward by the biasing force of the compression spring 46c. The rear-end tip portion of the positioning pin 46a abuts an outer-circumferential edge of the miter scale plate 7. If the positioning pin 46a is aligned with any of the positioning recesses 7a provided on (in) the outer-circumferential edge of the miter scale plate 7, the positioning pin 46a will enter into and engage the positioning recess 7a, thereby locking rotation of the turntable 4 at the prescribed miter angle that corresponds to the engaged positioning recess 7a. Thus, the turntable 4 is positioned and held by the positive-lock mechanism 45 at the prescribed miter-angle position corresponding to the engaged positioning recess 7a.

Referring now to FIG. 1, a tilt-fixing mechanism (bevel angle locking mechanism) 60 positions and holds the main-body support arm 50 tiltably in the clockwise and counterclockwise directions so that, e.g., bevel cuts can be performed. As shown in FIG. 13, the tilt-fixing mechanism 60 comprises the above-mentioned tilt-fixing manipulatable part (knob) 61 and a pivot rod 62, which are provided on a lower portion of the table-extension part 5, as well as the above-mentioned transmission shaft 63 (tilt-fixing transmission shaft), which extends from the table-extension part 5 to a rear portion of the turntable 4. The tilt-fixing manipulatable part 61 is manually rotatable about its axis extending in the front-rear direction. A circumferential-edge portion of the tilt-fixing manipulatable part 61 has a concave-convex shape (i.e. alternating ridges and grooves) to make it easy for the user to securely grasp and manually rotate the tilt-fixing manipulatable part 61. The outer circumference of the tilt-fixing manipulatable part 61 is formed with (has) a concave-convex shape (e.g., a pattern of alternating ridges and grooves) that differs from the pattern of alternating ridges and grooves defined on the concave-convex shape of the grip (knob) 41. Therefore, the user can easily discriminate (by touch) the tilt-fixing manipulatable part 61 from the grip 41 when grasping them, so that the likelihood of mis-manipulation of one or both of the tilt-fixing manipulatable part (first knob) 61 and the grip (second knob) 41 (e.g., simultaneous manipulation) can be reduced. A screw-shaft part (threaded sleeve) 61a extends rearward from a rear portion of the tilt-fixing manipulatable part 61. The screw-shaft part 61a is designed as a circular cylindrical sleeve having a through hole 61c (i.e. a hollow interior, through which the fixing rod 42 passes) and a male thread defined on at least a portion of its outer circumferential surface.

As shown in FIG. 10, the tilt-fixing manipulatable part 61 is provided (disposed) forward of the front surface of the table-extension part 5 and rearward of the grip 41. The male thread on the exterior surface of the screw-shaft part 61a is screwed into a screw hole 5d, which is provided in the front surface of the table-extension part 5 and has a female thread that corresponds to (matches) the male thread of the screw-shaft part 61a. The through hole 61c extends in the front-rear direction and is provided along the central portion of the tilt-fixing manipulatable part 61 and the screw-shaft part 61a. The fixing rod 42 is disposed in the through hole 61c such that the fixing rod 42 is rotatable relative to the tilt-fixing manipulatable part 61 and the screw-shaft part 61a, i.e. the fixing rod 42 may be rotated while the tilt-fixing manipulatable part 61 and the screw-shaft part 61a remain stationary. Furthermore, the tilt-fixing manipulatable part 61 is rotatable relative to the fixing rod 42, i.e. the tilt-fixing manipulatable part 61 and the screw-shaft part 61a may be rotated while the fixing rod 42 remains stationary. To achieve these functions, the rotary shaft (i.e. the screw-shaft part 61a) of the tilt-fixing manipulatable part 61 is coaxial with the rotary shaft (i.e. the fixing rod 42) of the grip 41. When the tilt-fixing manipulatable part 61 is manually rotated, the tilt-fixing manipulatable part 61 is displaced in the front-rear direction relative to the front surface of the table-extension part 5 owing to the threaded connection of the screw-shaft part (male thread) 61a and the screw hole (female thread) 5d.

As shown in FIG. 13, the pivot rod 62 extends substantially in the left-right direction. A rod pivot shaft (pivot pin) 62a extends in the up-down direction through approximately the center of the pivot rod 62 in the left-right direction. A rod-abutting part 61b is defined on a rear-end portion of the screw-shaft part 61a and is configured to abut a front surface of the pivot rod 62 leftward of the rod pivot shaft 62a. As can be seen in FIG. 10, the fixing rod 42 passes through a hole in the pivot rod 62 that is leftward of the rod pivot shaft 62a. The hole in the pivot rod 62 is defined so that it is large enough that the circumferential surface of the fixing rod 42 does not contact the pivot rod 62 even when the pivot rod 62 pivots, but small enough that the rod-abutting part 61b can press against the front surface of the pivot rod 62 leftward of the rod pivot shaft 62a. Referring again to FIG. 13, a front-end portion of the transmission shaft 63, which extends in the front-rear direction, is coupled to the other axial end of the pivot rod 62 that is rightward of the rod pivot shaft 62a. More specifically, a coupling part 63a in the form of a shaft or pin extends in the up-down direction (i.e. perpendicular to the longitudinal direction of the pivot rod 62) and operably couples (links by a hinge connection) the transmission shaft 63 and the pivot rod 62. As shown in FIG. 12, the pivot rod 62 is supported in the interior of the table-extension part 5 by the rod pivot shaft 62a so as to be pivotable forwardly and rearwardly in a horizontal plane, i.e. a plane defined by the left-right direction and the front-rear direction.

Figure 11:
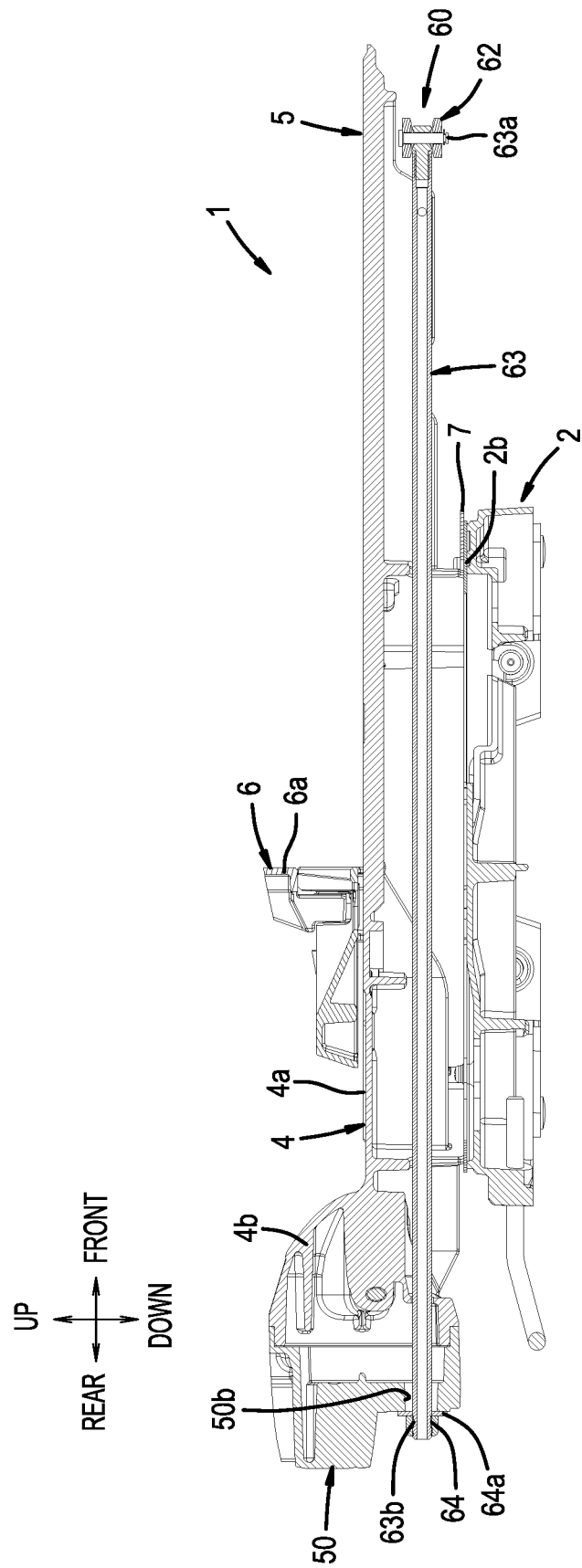
FIG. 11 is a cross-sectional oblique view taken along line XI-XI in FIG. 9 and is a longitudinal, cross-sectional view of the lower portion of the benchtop cutting machine according to the first embodiment.

As shown in FIG. 12, the transmission shaft 63 is disposed such that it is aligned rightward of the fixing rod 42, i.e. the transmission shaft 63 and the fixing rod 62 are disposed in parallel, preferably in the same horizontal plane. As shown in FIG. 9, the transmission shaft 63 is disposed leftward of a right-edge portion of the table-extension part 5 and is provided such that it extends in the front-rear direction rightward of the rotary spindle 2a. That is, the transmission shaft 63 circumvents the rotary spindle 2a so that it does not intersect the center of rotation of the turntable 4. As shown in FIG. 11, a rear portion of the transmission shaft 63 passes through the arm-support part 4b and the main-body support arm 50. A threaded shaft end (screw-shaft part) 63b is provided on a rear-end portion of the transmission shaft 63, which protrudes rearward beyond the arcuate hole 50b of the main-body support arm 50. The threaded shaft end 63b has a male thread on its outer circumferential surface. A nut 64 having a matching female thread is tightened onto the threaded shaft end 63b. A washer 64a is interposed between the nut 64 and a rear surface of the main-body support arm 50.

Referring now to FIG. 13, when the tilt-fixing manipulatable part 61 is manually rotated in the clockwise direction about its rotational axis, the tilt-fixing manipulatable part 61 is displaced rearward (away from the user) owing to the threaded engagement of the screw-shaft part 61a and the screw hole 5d. As a result, the portion of the pivot rod 62 leftward of the rod pivot shaft 62a is pushed by the rod-abutting part 61b and is thereby displaced rearward. Because the pivot rod 62 then pivots about the axis of the rod pivot shaft 62a, the portion of the pivot rod 62 rightward of the rod pivot shaft 62a is pulled forward (towards the user). Accordingly, the transmission shaft 63, which is coupled to the right-side portion of the pivot rod 62, is pulled forward. As shown in FIG. 11, the nut 64 is thereby pulled forward by the transmission shaft 63, which causes a front portion of the main-body support arm 50 to be pressed by a rear portion of the arm-support part 4b. Consequently, the main-body support arm 50 is fixed (clamped) relative to the arm-support part 4b and positioned and held at a fixed clockwise-counterclockwise tilt (bevel) angle.

On the other hand, when the tilt-fixing manipulatable part 61 is manually rotated in the counterclockwise direction about its rotational axis, the tilt-fixing manipulatable part 61 is displaced forward owing to the threaded engagement of the screw-shaft part 61a and the screw hole 5d. As a result, the pushing force of the rod-abutting part 61b, which pushes the portion of the pivot rod 62 leftward of the rod pivot shaft 62a rearward, is released. Thereby, the force that pulls the portion of the pivot rod 62 rightward of the rod pivot shaft 62a forward is released. Accordingly, as shown in FIG. 11, because the force that pulls the transmission shaft 63 and the nut 64 forward is also released, the pressing force that presses the main-body support arm 50 toward (against) the arm-support part 4b is released. Thus, the main-body support arm 50 becomes tiltable clockwise and counterclockwise about the axis of the clockwise-counterclockwise tilting pivot 50a (refer to FIG. 10) relative to the arm-support part 4b. When the main-body support arm 50 is tilted clockwise or counterclockwise, the arcuate hole 50b is displaced about the axis of the clockwise-counterclockwise tilting pivot 50a relative to the rear-end portion of the transmission shaft 63. Consequently, it is possible to prevent the transmission shaft 63, which protrudes rearward beyond the main-body support arm 50, from hindering the clockwise-counterclockwise tilting of the main-body support arm 50.

In the benchtop cutting machine 1 of the first embodiment as explained above, the turntable 4 has the table-extension part (extension arm) 5, which extends forward, and is supported on the base 2 so as to be rotatable in a horizontal plane. The cutting-machine main body 10 is provided upward of the turntable 4 and rotatably supports the cutting tool 11. By tightening the turntable-fixing mechanism 40, the turntable 4 is fixable relative to the base 2 at any arbitrary miter angle between left and right end points for rotation (turning) of the turntable 4 relative to the base 2. The main-body support arm 50 is provided rearward of the arm-support part 4b of the turntable 4 and supports the cutting-machine main body 10 such that the cutting-machine main body 10 is tiltable in the clockwise and counterclockwise directions to enable bevel cuts. The tilt-fixing mechanism 60 is configured to fix (hold) the tilt (bevel angle) of the cutting-machine main body 10 in the clockwise and counterclockwise directions. The turntable-fixing mechanism 40 comprises the manually rotatable grip (knob) 41 and the fixing rod 42. When the grip 41 is manually rotated, the fixing rod 42 can fix the turntable 4 with respect to the base 2 to impede (prevent) relative rotation (turning) in the horizontal plane. The grip 41 is disposed forward of the front surface (i.e. the forwardmost end surface) of the table-extension part 5, downward of the upper surface of the turntable 4, and at the center of the table-extension part 5 in the left-right direction. The tilt-fixing mechanism 60 comprises the manually rotatable tilt-fixing manipulatable part (knob) 61. The rotary shaft (i.e. the screw-shaft part 61a) of the tilt-fixing manipulatable part 61 is provided coaxially with the rotary shaft (i.e. the fixing rod 42) of the grip 41, i.e. the rotary shaft (i.e. the screw-shaft part 61a) of the tilt-fixing manipulatable part 61 radially surrounds the rotary shaft (i.e. the fixing rod 42) of the grip 41. The tilt-fixing manipulatable part 61 is provided forward of the front surface (i.e. the forwardmost end surface) of the table-extension part 5 and rearward of the grip 41.

Accordingly, the user can easily manipulate (rotate) the grip 41 and the tilt-fixing manipulatable part 61 while standing in front of the benchtop cutting machine 1. That is, the ease of operation of the tilt-fixing manipulatable part 61 can be improved while maintaining the excellent ease of operation of the grip 41. In addition, the grip 41, which is manipulated more frequently, is provided forward of the tilt-fixing manipulatable part 61 and is nearer to the user, who is normally positioned (standing) in front of the benchtop cutting machine 1 when operating the benchtop cutting machine 1. Accordingly, it is possible to reduce the risk that the tilt-fixing manipulatable part 61 will be mistakenly manipulated instead of the grip 41. Furthermore, the grip 41 also functions as a manipulatable part that the user grasps when rotating (turning) the turntable 4 left-right in the horizontal plane. In this embodiment, because the grip 41 is located farther from the rotary spindle 2a, greater leverage is provided, which makes the turntable 4 easily rotatable by grasping and turning the grip 41.

In addition, in the above-described benchtop cutting machine 1, the tilt-fixing mechanism 60 comprises the transmission shaft 63, which extends in the front-rear direction from the front portion of the table-extension part 5 to the main-body support arm 50. The transmission shaft 63 is provided between the rotary spindle 2a and the right-end portion of the table-extension part 5.

Accordingly, the transmission shaft 63 can be provided, circumventing (not intersecting) the rotary spindle 2a, in the empty space in the lower portions of the turntable 4 and the table-extension part 5. Consequently, the axial force applied to the forward end of the transmission shaft can be transmitted to rearward end of the transmission shaft 63 without significant losses, which means that the manipulation force (torque) applied to the tilt-fixing manipulatable part 61 is converted into an axial force that is at least nearly completely transmitted to the main-body support arm 50.

In addition, the above-described benchtop cutting machine 1 comprises the positive-lock mechanism 45, which positions and holds (locks) the turntable 4 at prescribed rotational angles (miter angles). The transmission shaft 63 is aligned (parallel) rightward of the fixing rod 42 and extends in the front-rear direction. The positioning pin 46a of the positive-lock mechanism 45 is located downward of the fixing rod 42.

Accordingly, the fixing rod 42, the transmission shaft 63, and the positioning pin 46a are arranged in substantially a right-triangle shape, viewed from the front. Thereby, the turntable-fixing mechanism 40 and the tilt-fixing mechanism 60 are disposed compactly in the up-down direction. Furthermore, the positioning pin 46a of the positive-lock mechanism 45 can be disposed downward of the fixing rod 42, which is vacant, making it compact in the up-down direction. Thus, the turntable-fixing mechanism 40, the tilt-fixing mechanism 60, and the positive-lock mechanism 45 can be disposed in the state in which ease of operation is maintained while utilizing a minimal space downward of the upper surface of the table-extension part 5.

In addition, in the above-described benchtop cutting machine 1, the tilt-fixing mechanism 60 comprises the pivot rod 62, which is disposed in the interior of the table-extension part 5. The pivot rod 62 is pivotable about the vertically-extending rod pivot shaft 62a in the front-rear direction. Furthermore, the left-side portion of the pivot rod 62 is configured to abut (be pressed by) the rod-abutting part 61b of the tilt-fixing manipulatable part 61, and the right-side portion of the pivot rod 62 is operably coupled (linked by a hinge connection) to the transmission shaft 63 via the coupling part 63a. The tilt-fixing manipulatable part 61 comprises, on its rear portion, the screw-shaft part 61a, which displaces the manually rotated tilt-fixing manipulatable part 61 in the front-rear direction. Because the tilt-fixing manipulatable part 61 and the screw-shaft part 61a can be displaced rearward by rotation of the screw-shaft part 61a in the screw hole 5d, the rod-abutting part 61b of the screw-shaft part 61a causes the left-side portion of the pivot rod 62, which abuts the rod-abutting part 61b, to be pushed rearward so that the pivot rod 62 pivots about the vertically-extending pivot axis defined by the rod pivot shaft 62a. Thereby, the right-side portion of the pivot rod 62 generates a forward (axial) pulling force on the transmission shaft 63. The main-body support arm 50, which is pulled forward by this pulling force, is pressed against and thereby fixed to (clamped against) the rear surface of the arm-support part 4b of the turntable 4.

Accordingly, the tilt-fixing mechanism 60 can be configured simply, using relatively few components, namely the tilt-fixing manipulatable part 61, the pivot rod 62, and the transmission shaft 63. Thereby, the tilt-fixing mechanism 60 can be provided in a compact manner. In addition, maintenance of the tilt-fixing mechanism 60 is easy or the tilt-fixing mechanism 60 is even maintenance-free, and the ease of operation of the tilt-fixing manipulatable part 61 is easy to maintain.

Second Exemplary Embodiment

Figure 15:
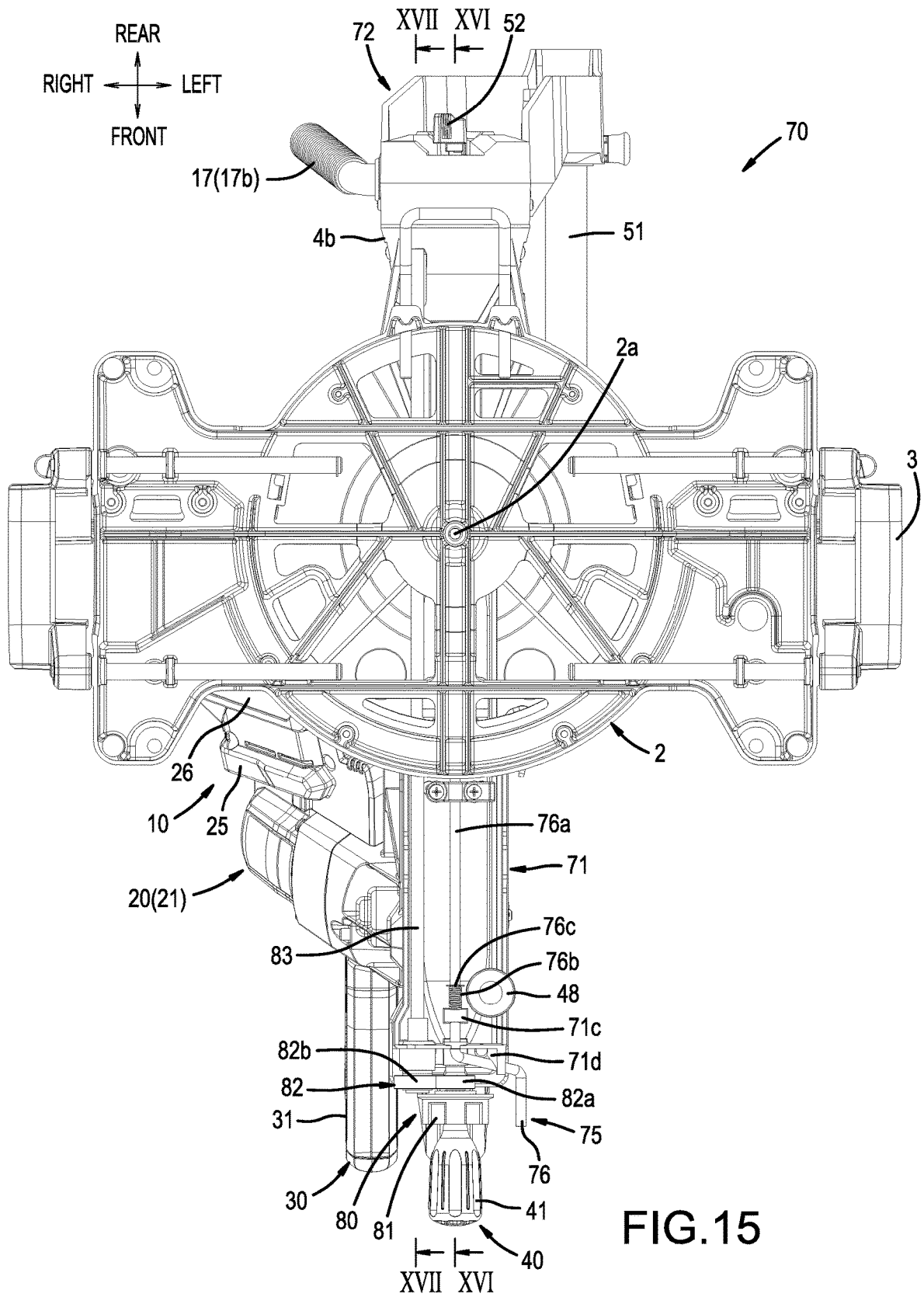
FIG. 15 is a bottom view of the benchtop cutting machine according to a second exemplary embodiment of the present teachings.

Next, a benchtop cutting machine 70 of a second exemplary embodiment of the present teachings will be explained, with reference to FIGS. 15-19. This benchtop cutting machine 70 is also known in the art as a sliding compound miter saw. As shown in FIG. 15, instead of the table-extension part 5, the positive-lock mechanism 45, the main-body support arm 50, and the tilt-fixing mechanism 60 of the benchtop cutting machine 1 according to the first exemplary embodiment, e.g., shown in FIG. 9, the benchtop cutting machine 70 comprises a table-extension part 71, a positive-lock mechanism 75, a main-body support arm 72 (main-body tilting part), and a tilt-fixing mechanism (bevel angle setting mechanism) 80. In the explanation below, the details of only the structural elements that differ from those in the first embodiment will be explained.

Figure 16:
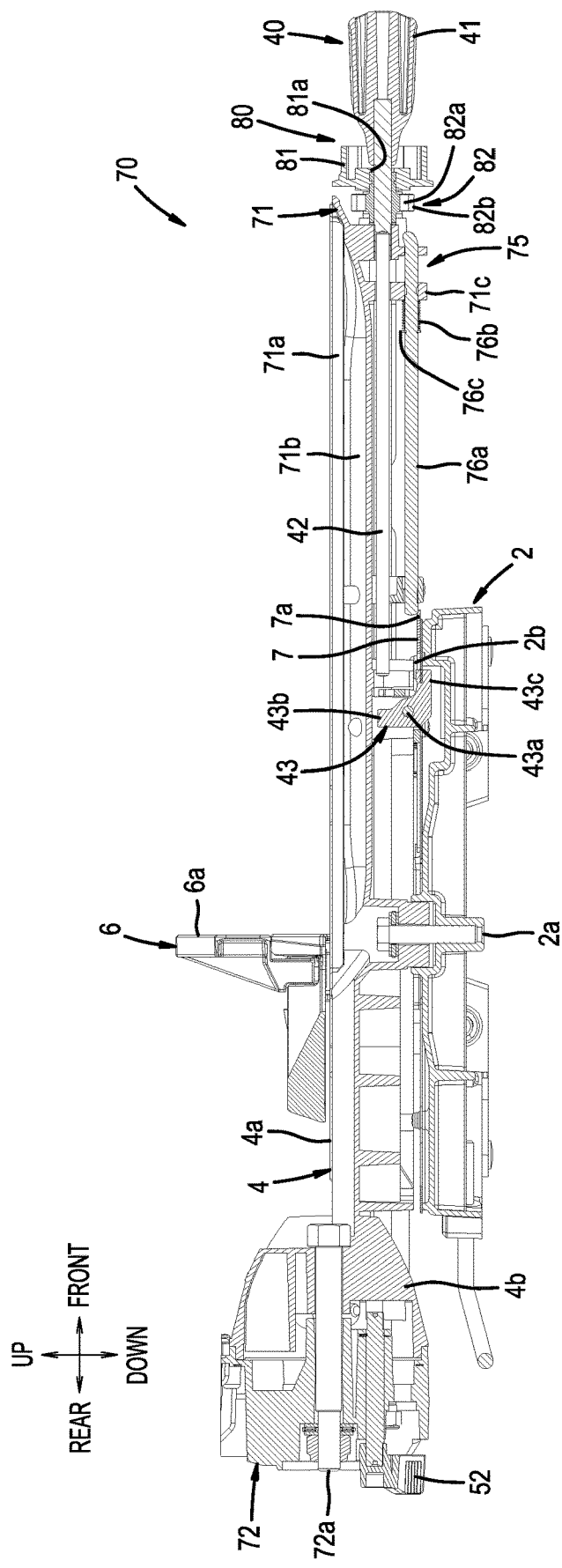
FIG. 16 is a cross-sectional oblique view taken along line XVI-XVI in FIG. 15 and is a longitudinal, cross-sectional view of the lower portion of the benchtop cutting machine according to the second embodiment.

As shown in FIG. 16, a kerf board 71a is provided on the upper surface of the table-extension part 71. A slot 71b, which defines a gap for receiving the cutting tool 11, is provided along the center of the kerf board 71a. The turntable-fixing mechanism (miter angle setting mechanism) 40, the positive-lock mechanism 75, and the tilt-fixing mechanism 80 are provided on the lower portion of the table-extension part 71. As shown in FIG. 15, the positive-lock mechanism 75 comprises a lock-release lever 76 and a positioning pin (locking pin or lock rod) 76a. The lock-release lever 76 is disposed forward of the front surface of the table-extension part 71 and is disposed leftward of the grip 41 and leftward of a tilt-fixing manipulatable part (knob) 81, which is further described below. The lock-release lever 76 is integrally coupled to a front end of the positioning pin 76a. The lock-release lever 76 is manipulatable in the up-down direction such that it pivots about the axis (longitudinal direction) of the positioning pin 76a. As shown in FIG. 16, the positioning pin 76a is provided downward of the fixing rod 42 and extends in the front-rear direction at substantially the same height as the miter scale plate 7. The positioning pin 76a is supported by the lower portion of the table-extension part 71 and is capable of being displaced (slid) in the front-rear direction. A flange 76c, which extends outward in the radial direction, is provided on a front portion of the positioning pin 76a. The table-extension part 71 comprises a spring seat 71c forward of the flange 76c. A compression spring 76b is provided between the flange 76c and the spring seat 71c. The positioning pin 76a is biased rearward by the compression spring 76b.

As shown in FIG. 15, a lever guide 71d is provided on the lower portion of the table-extension part 71. The lever guide 71d has a tilted surface, which is tilted forward to rearward, toward the center from a left-end-portion side of the table-extension part 71. The lock-release lever 76 is manipulated in the up-down direction while abutting against the tilted surface of the lever guide 71d. When the lock-release lever 76 is manipulated by being pushed downward, it is displaced forward along the tilted surface of the lever guide 71d. Thereby, the positioning pin 76a, which is integral with the lock-release lever 76, is displaced forward against the biasing force of the compression spring 76b. Accordingly, the rear-end tip portion of the positioning pin 76a is displaced (shifted) to the position at which its engagement with the positioning recesses 7a (refer to FIG. 16) is releasable. When the lock-release lever 76 is manipulated and pulled upward, it is displaced rearward along the tilted surface of the lever guide 71d. The positioning pin 76a, together with the lever guide 71d, is displaced rearward by the biasing force of the compression spring 76b. Accordingly, the rear-end tip portion of the positioning pin 76a is displaced (shifted) to the position at which it is engageable with (in) one of the positioning recesses 7a.

As shown in FIG. 15, the tilt-fixing mechanism 80 comprises the tilt-fixing manipulatable part (knob) 81, a speed-reducing gear part (gear train or gear transmission) 82, and a transmission shaft 83 (tilt-fixing transmission shaft). The tilt-fixing manipulatable part 81 is manually rotatable about its longitudinal axis that extends in the front-rear direction. The tilt-fixing manipulatable part 81 is provided forward of the front surface of the table-extension part 71 and rearward of the grip 41. A drive-side gear 82a of the speed-reducing gear part 82 is provided on the rear portion of the tilt-fixing manipulatable part 81 so that the drive-side gear 82a and the tilt-fixing manipulatable part 81 rotate integrally (as one unit). As shown in FIG. 16, a through hole 81a, which passes through in the front-rear direction, is provided in central portions of the tilt-fixing manipulatable part 81 and the drive-side gear 82a. The fixing rod 42 extends through the through hole 81a such that the fixing rod 42 is rotatable relative to of the tilt-fixing manipulatable part 81 and the drive-side gear 82a and vice versa. Therefore, because the tilt-fixing manipulatable part 81 and the drive-side gear 82a are coaxial with the fixing rod 42, the tilt-fixing manipulatable part 81, the drive-side gear 82a and the fixing rod 42 are all rotatable about a common rotational axis. That is, the rotary shaft (i.e. the drive-side gear 82a) of the tilt-fixing manipulatable part 81 is coaxial with the rotary shaft (i.e. the fixing rod 42) of the grip 41.

Figure 17:
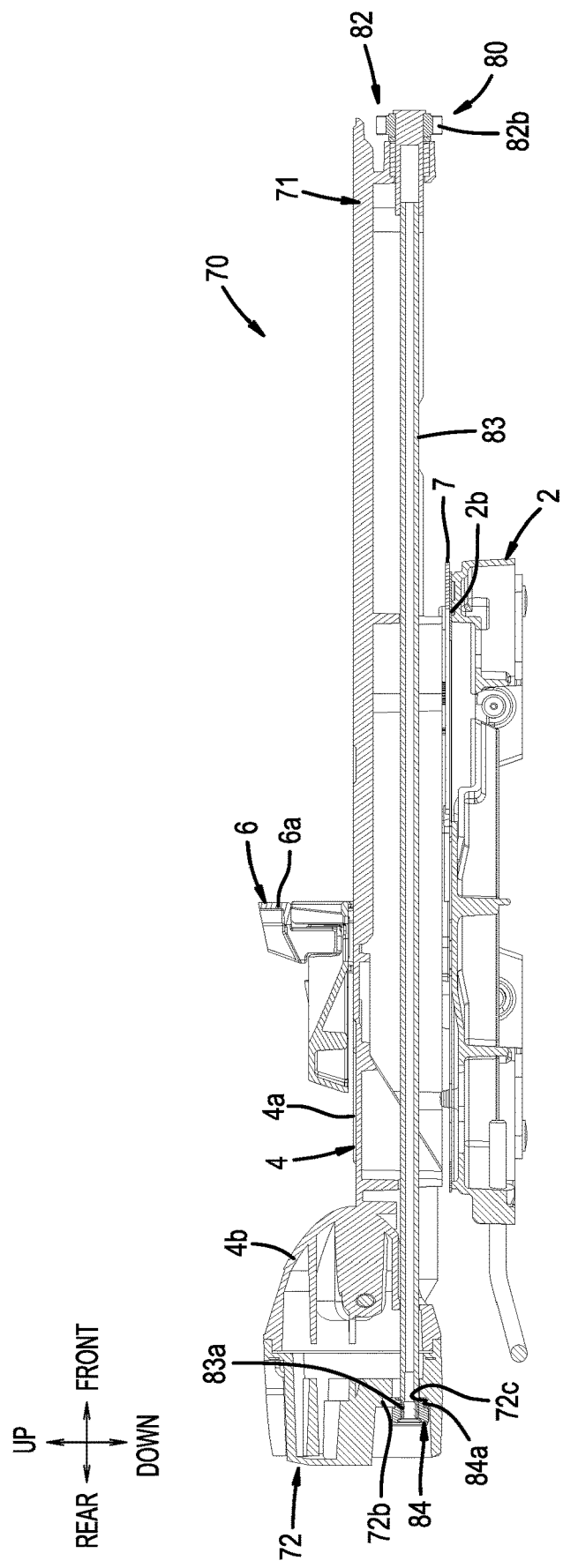
FIG. 17 is a cross-sectional oblique view taken along line XVII-XVII in FIG. 15 and is a longitudinal, cross-sectional view of the lower portion of the benchtop cutting machine according to the second embodiment.
Figure 18:
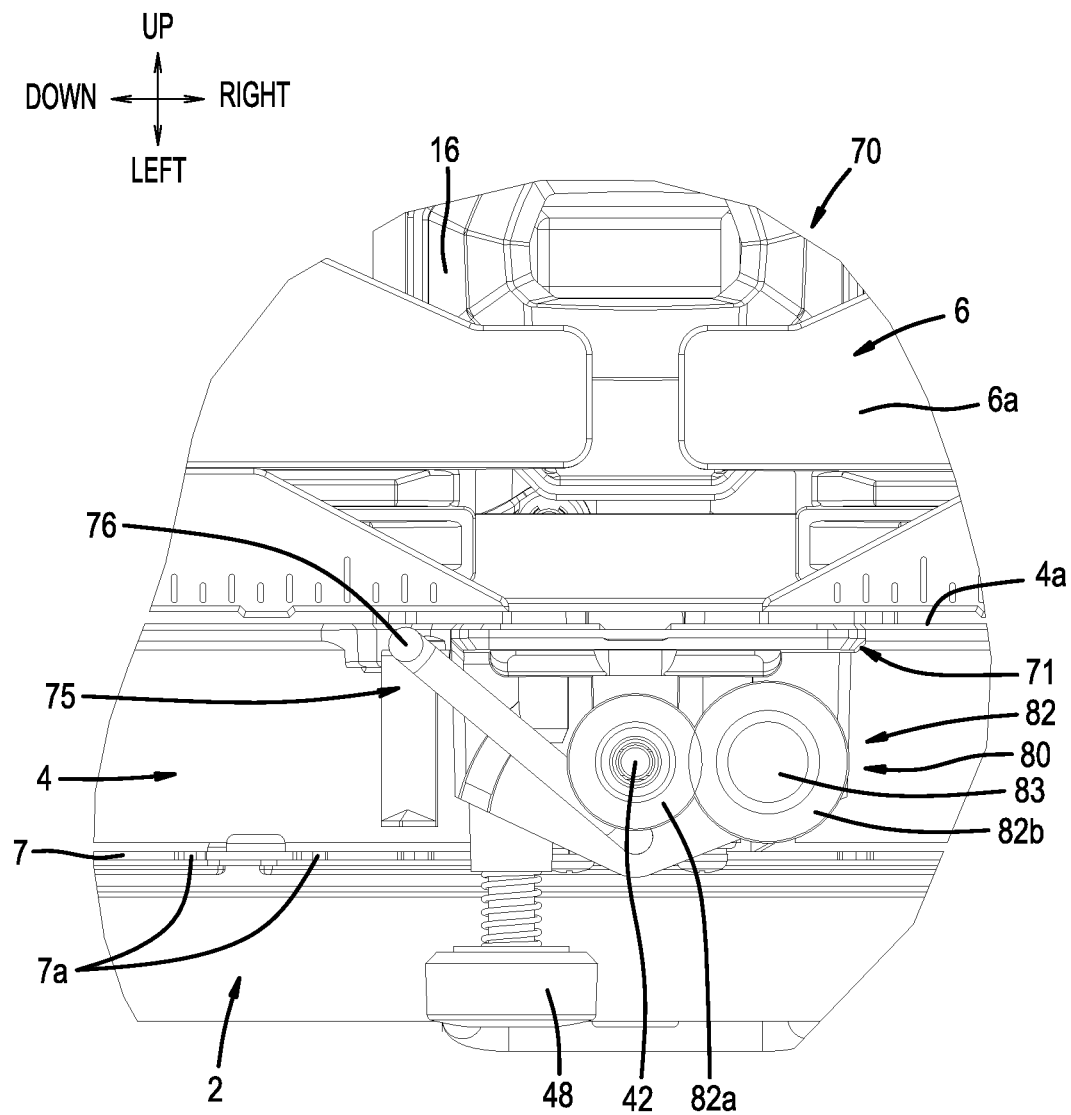
FIG. 18 is a front view of a speed-reducing gear part and the surroundings thereof according to the second embodiment.

As shown in FIG. 15, the speed-reducing gear part 82 comprises the drive-side gear 82a and also a follower-side gear 82b. The follower-side gear 82b is provided on a front end of the transmission shaft 83, which extends in the front-rear direction, so that the follower-side gear 82b and the transmission shaft 83 rotate integrally (as one unit). Therefore, the follower-side gear 82b is rotatable about the longitudinal (rotational) axis of the transmission shaft 83. As shown in FIG. 18, the follower-side gear 82b is aligned rightward of the drive-side gear 82a and meshes with the drive-side gear 82a. The rotation of the drive-side gear 82a is decelerated and transmitted by the follower-side gear 82b, thereby amplifying the torque that is manually applied to tilt-fixing manipulatable part 81. The speed-reduction ratio (mechanical advantage ratio) of the drive-side gear 82a to the follower-side gear 82b is, for example, 1:1.5, e.g., the follower-side gear 82b preferably has 1.5 times more teeth than the drive-side gear 82a, although the follower-side gear 82b may have 1.1-2.5 times more teeth than the drive-side gear 82a, e.g., 1.3-2.0 times more teeth. The transmission shaft 83 is disposed by being aligned (parallel) rightward of (parallel to) the fixing rod 42, preferably in the same horizontal plane. As shown in FIG. 15, the transmission shaft 83 is leftward of the right-end portion of the table-extension part 71 and is provided rightward of the rotary spindle 2a. Thus, the transmission shaft 83 is straight and does not intersect the rotary spindle 2a in this embodiment as well. As shown in FIG. 17, the rear portion of the transmission shaft 83 passes through the arm-support part 4b and the main-body support arm 72. A threaded shaft end (screw-shaft part) 83a is provided on the rear-end portion of the transmission shaft 83, which protrudes rearward beyond the main-body support arm 72. A nut 84 is mounted on the threaded shaft end 83a. Flat parts 84a, which are provided on mutually opposite sides (i.e. diametrically opposite surfaces of the nut 84) and each of which is substantially planar, are formed on a front portion of the nut 84, which generally has a columnar shape in cross section.

Figure 19:
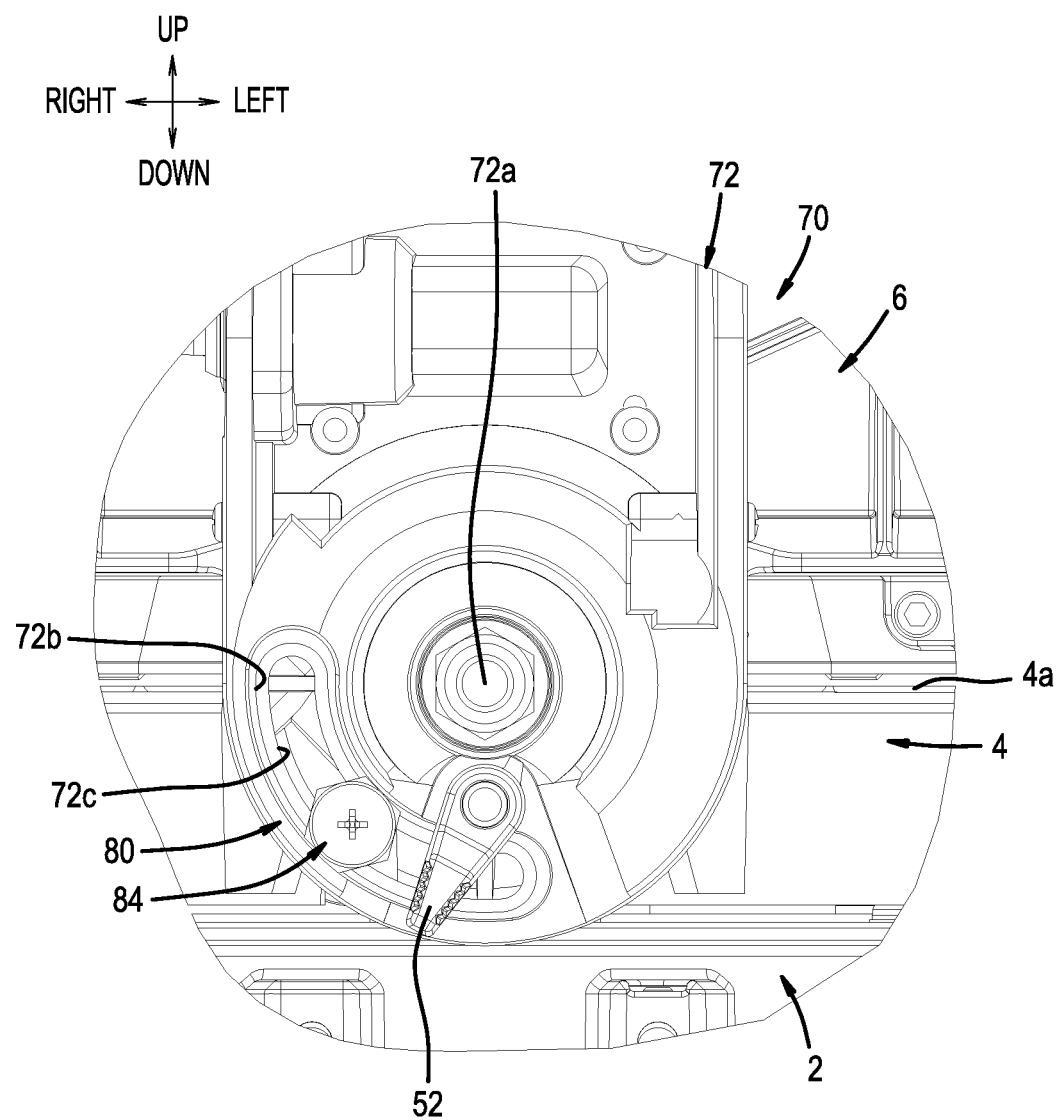
FIG. 19 is a rear view of a main-body tilting part and the tilt-fixing mechanism according to the second embodiment.

As shown in FIG. 16, the main-body support arm 72 is supported such that it is tiltable in the clockwise and counterclockwise directions relative to the arm-support part 4b about a clockwise-counterclockwise tilting pivot 72a, which extends in the front-rear direction, to perform bevel cuts. As shown in FIG. 19, an arcuate hole 72b and a rotation-stop hole 72c are provided in a lower portion of the main-body support arm 72. The arcuate hole 72b has an arcuate shape centered on the clockwise-counterclockwise tilting pivot 72a and passes through in the front-rear direction. The rotation-stop hole 72c is provided frontward of the arcuate hole 72b and is formed along the arcuate hole 72b. The rotation-stop hole 72c is provided such that its length in a width direction (the radial direction centered on the clockwise-counterclockwise tilting pivot 72a) is smaller than that of the arcuate hole 72b. As shown in FIG. 17, a shaft portion (front portion) of the nut 84 is configured to enter the arcuate hole 72b. The flat parts 84a alone are configured to enter the rotation-stop hole 72c. Rotation of the nut 84 is thereby restricted (blocked) by the interaction (form fit) of the flat parts 84a of the nut 84 and the rotation-stop hole 72c.

As shown in FIG. 15, when the tilt-fixing manipulatable part 81 is manually rotated, the rotation is decelerated by the speed-reducing gear part 82 such that the transmission shaft 83 rotates about its longitudinal (rotational) axis at a slower rotational speed than the rotational speed of the tilt-fixing manipulatable part 81 but at a higher torque. As shown in FIG. 17, rotation of the nut 84, which is mounted on the threaded shaft end 83a, about the axis of the transmission shaft 83 is restricted (blocked). Accordingly, when the transmission shaft 83 is rotated in one direction (i.e. in the clockwise direction), the (non-rotatable) nut 84 is tightened onto the threaded shaft end 83a. Thereby, the main-body support arm 72 is pressed toward (against) the arm-support part 4b, whereby the main-body support arm 72 is fixed to the arm-support part 4b and is positioned (held) at a fixed clockwise-counterclockwise tilt (bevel) angle. When the transmission shaft 83 is rotated in the reverse direction, the tightening of the nut 84 and the threaded shaft end 83a is loosened. Thereby, the pressing force that presses the main-body support arm 72 toward the arm-support part 4b side is released. As a result, the main-body support arm 72 becomes tiltable clockwise and counterclockwise about the axis of the clockwise-counterclockwise tilting pivot 72a (refer to FIG. 16) relative to the arm-support part 4b.

In the benchtop cutting machine 70 of the second embodiment as explained above, the tilt-fixing mechanism 80 comprises the speed-reducing gear part 82, which is constituted by the drive-side gear 82a and the follower-side gear 82b. The drive-side gear 82a is provided on (rotates integrally with) the tilt-fixing manipulatable part 81. The follower-side gear 82b is provided on (rotates integrally with) the transmission shaft 83. The threaded shaft end 83a is provided on the rear portion of the transmission shaft 83. The nut 84 is mounted on the threaded shaft end 83a. Therefore, when the tilt-fixing manipulatable part 81 is manually rotated, the transmission shaft 83 is rotated via the speed-reducing gear part 82 at a reduced speed but increased torque. The nut 84 and the threaded shaft end 83a of the transmission shaft 83 are thereby tightened to one another, such that the main-body support arm 72 is pressed (clamped) against the arm-support part 4b of the turntable 4. Thereby, the orientation (tilt) of the main-body support arm 72 relative to the arm-support part 4b is fixed (held).

Accordingly, the nut 84 can be tightened using a large torque without increasing the size of the tilt-fixing mechanism 80 in the left-right direction owing to the usage of the speed-reducing (torque-increasing) gear part 82. Thereby, the tilt-fixing manipulatable part 81 becomes manipulatable with a relatively small torque while still ensuring a secure fixing (clamping) of the main-body support arm 72 for bevel cutting operations.

Third Exemplary Embodiment

Figure 20:
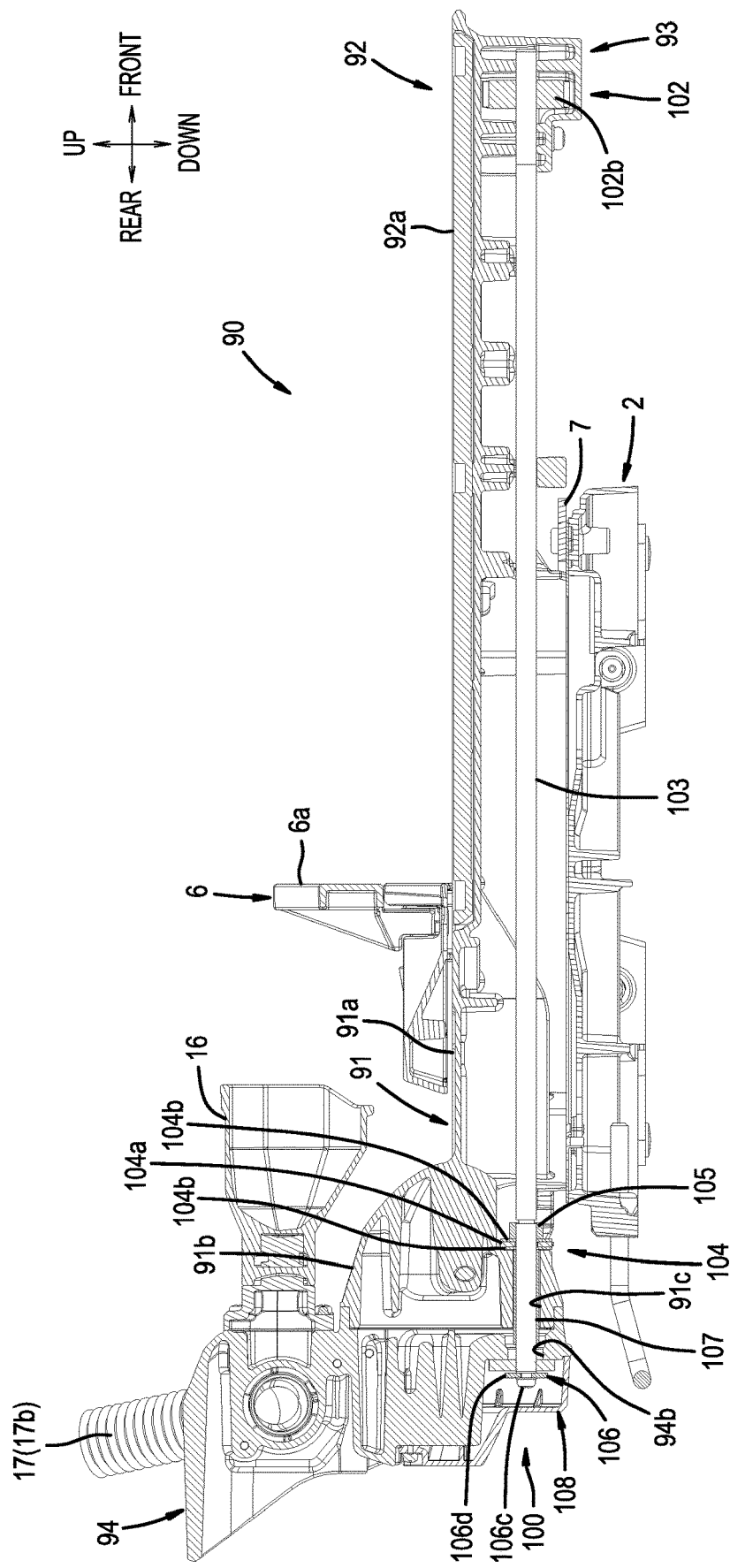
FIG. 20 is a longitudinal, cross-sectional view of the lower portion of the benchtop cutting machine according to a third exemplary embodiment of the present teachings and is a cross-sectional view that corresponds to the cross-sectional oblique view taken along line XVII-XVII in FIG. 15.

Next, a benchtop cutting machine 90 of a third exemplary embodiment of the present teachings will be explained, with reference to FIGS. 20-27. This benchtop cutting machine 90 is also known in the art as a sliding compound miter saw. As shown in FIG. 20, instead of the tilt-fixing mechanism 80, the turntable 4, and the main-body support arm 72 of the second embodiment shown in FIG. 17, the benchtop cutting machine 90 comprises a tilt-fixing mechanism (bevel angle locking mechanism) 100, a turntable 91, and a main-body support arm 94 (main-body tilting part). In the explanation below, only structural elements that differ from those in the first and second embodiments will be explained in detail.

Figure 23:
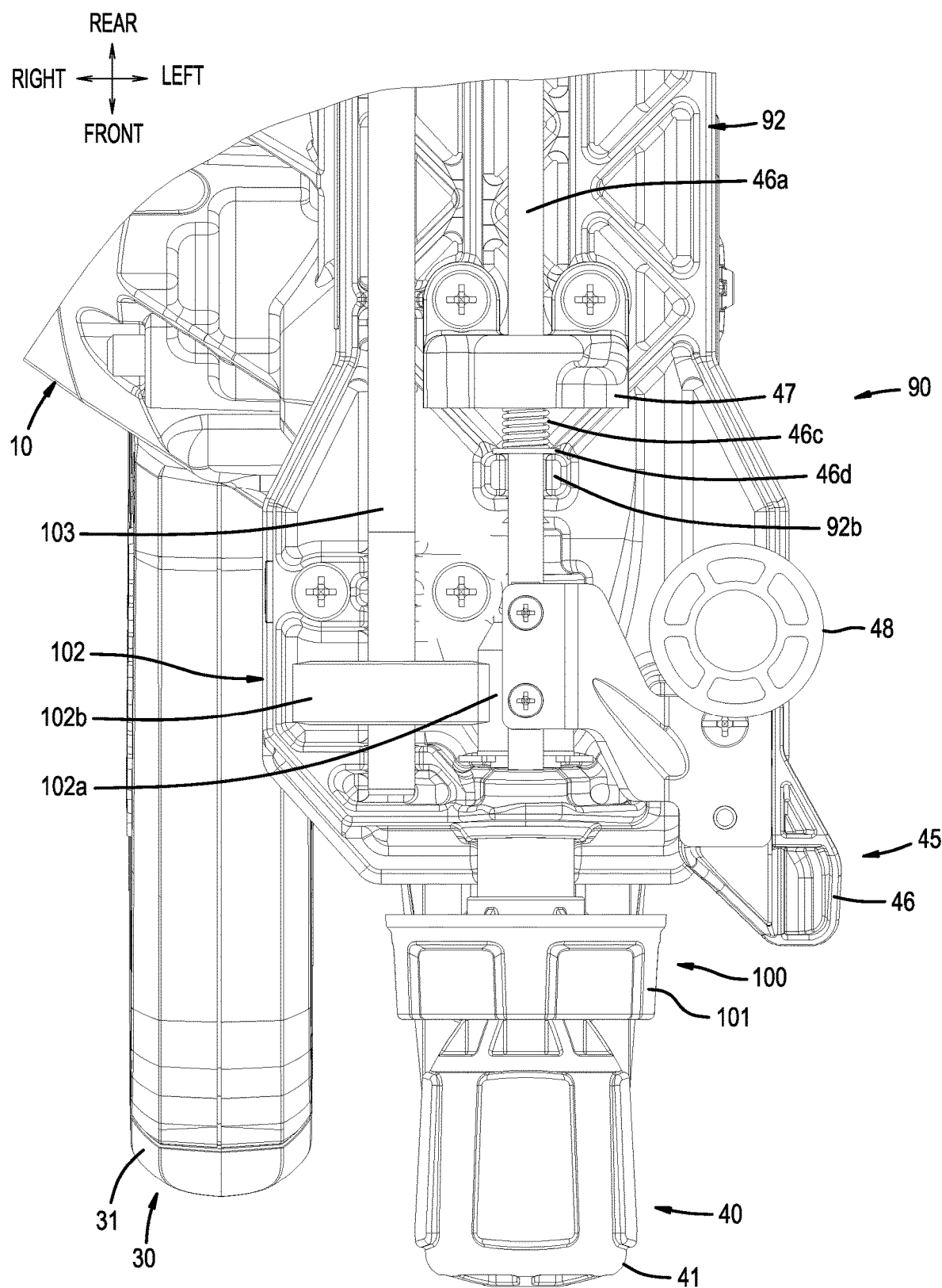
FIG. 23 is a bottom view of the speed-reducing gear part and the surroundings thereof according to the third embodiment.

As shown in FIG. 20, the turntable 91 comprises a table-extension part (extension arm) 92, which extends along the cutting-plane direction of the cutting tool 11 (refer to FIG. 1). A kerf board or kerf boards 92a is (are) provided on an upper surface of the table-extension part 92. As shown in FIG. 23, the turntable-fixing mechanism (miter angle locking mechanism) 40, the positive-lock mechanism 45, and the tilt-fixing mechanism 100 are provided on (in) a lower portion of the table-extension part 92. A spring seat 92b, which protrudes downward, is provided on the lower portion of the table-extension part 92. The spring seat 92b restricts forward movement of the washer 46d, which is biased forward by the compression spring 46c of the positive-lock mechanism 45.

Figure 26:
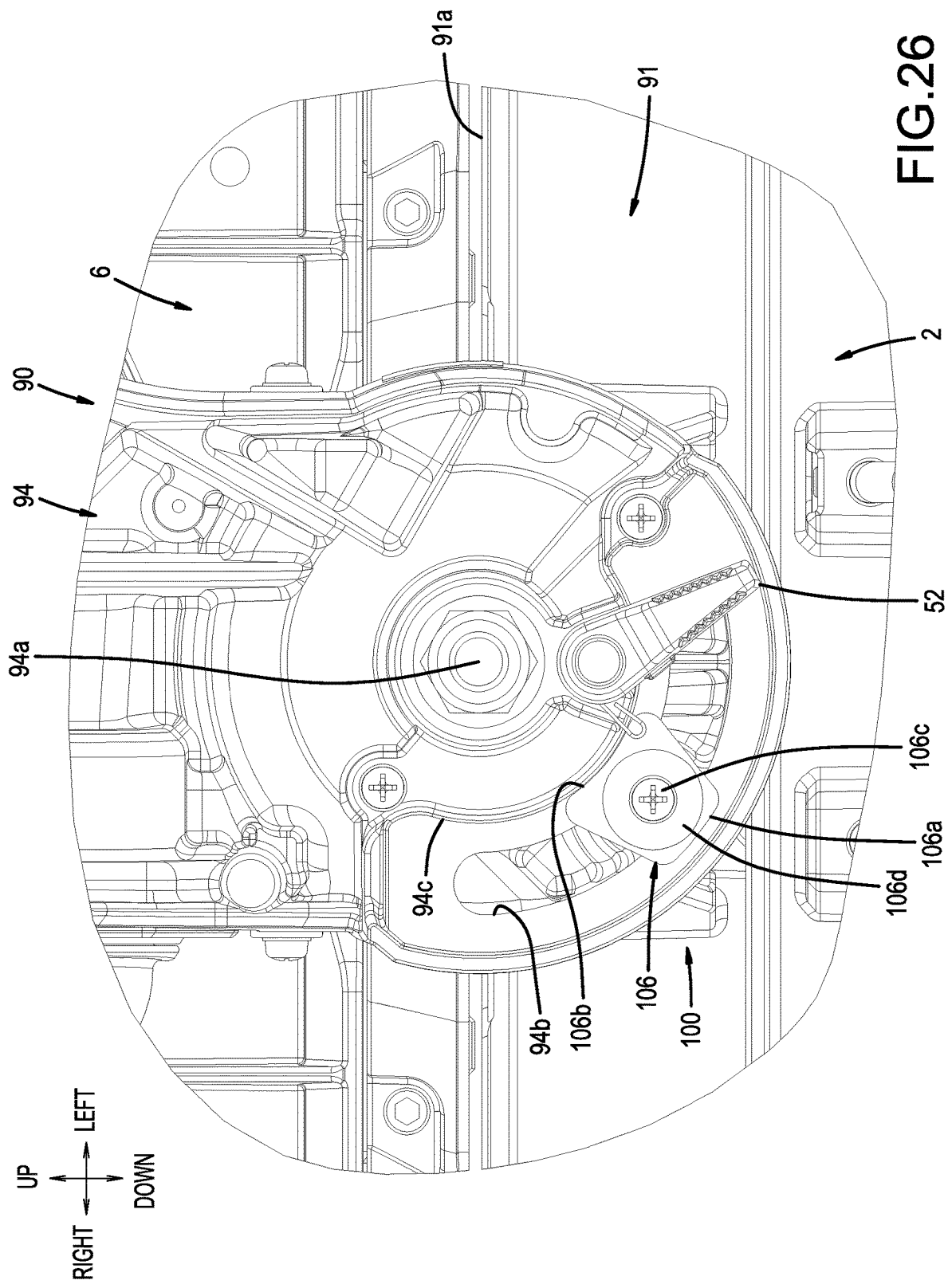
FIG. 26 is a rear view of the main-body tilting part and the tilt-fixing mechanism according to the third embodiment.

As shown in FIG. 20, the turntable 91 comprises an arm-support part 91b rearward of a horizontal table upper surface 91a. A through hole 91c, which has a circular shape and passes through in the front-rear direction, is provided in the lower portion of the arm-support part 91b. The main-body support arm 94, which extends substantially upward, is provided rearward of the arm-support part 91b. The main-body support arm 94 is supported such that it is tiltable in the clockwise and counterclockwise directions about a clockwise-counterclockwise tilting pivot 94a (refer to FIG. 26) relative to the arm-support part 91b to set the bevel angle. As shown in FIG. 26, the main-body support arm 94 has an arcuate hole 94b, which passes through in the front-rear direction and has an arcuate shape centered on the clockwise-counterclockwise tilting pivot 94a.

Figure 25:
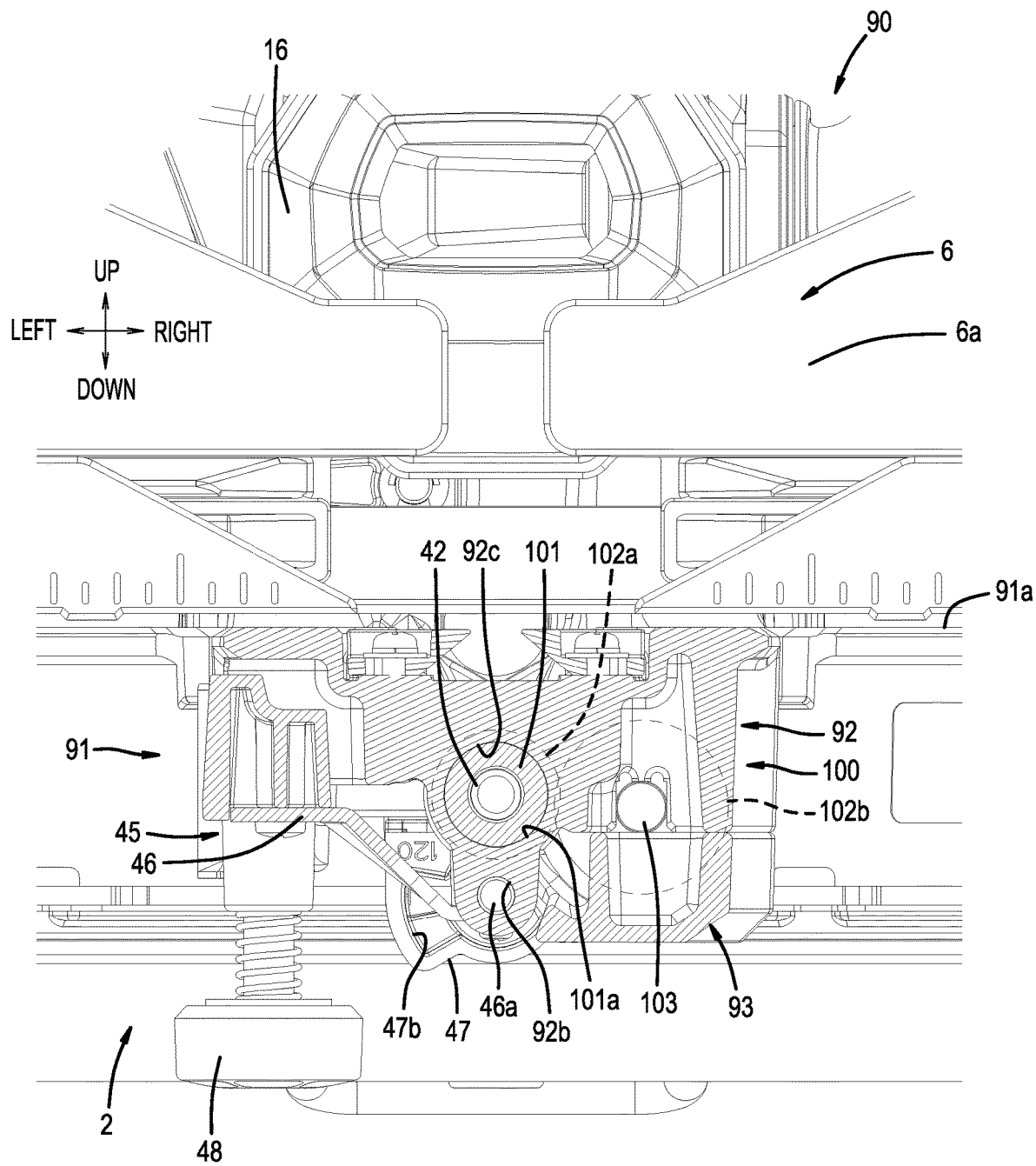
FIG. 25 is a cross-sectional oblique view taken along line XXV-XXV in FIG. 24 and is a longitudinal, cross-sectional view of the speed-reducing gear part and the surroundings thereof according to the third embodiment.

As shown in FIG. 23, the tilt-fixing mechanism 100 comprises a tilt-fixing manipulatable part (knob) 101, a speed-reducing gear part (gear train or gear transmission) 102, and a transmission shaft 103 (tilt-fixing transmission shaft). The tilt-fixing manipulatable part 101 is manually rotatable around its longitudinal axis that extends in the front-rear direction. As shown in FIG. 25, a through hole 92c, which extends in the front-rear direction, is provided in the table-extension part 92. A shaft portion of the tilt-fixing manipulatable part 101 extends through the through hole 92c and is rotatably supported around its longitudinal (rotational) axis. Thus, the through hole 92c acts as a plain bearing or journal bearing for rotatably supporting the tilt-fixing manipulatable part 101 so that, unlike the first embodiment, the tilt-fixing manipulatable part 101 does not axially displace when manually rotated. The same arrangement is applicable to the second embodiment described above.

As shown in FIG. 23, the tilt-fixing manipulatable part 101 is provided forward of the front surface of the table-extension part 92 and rearward of the grip (knob) 41 of the turntable-fixing mechanism 40. The speed-reducing (torque increasing) gear part 102 is provided rearward of the tilt-fixing manipulatable part 101. The speed-reducing gear part 102 comprises a drive-side gear 102a and a follower-side gear 102b. The drive-side gear 102a is provided integrally with a rear portion of the tilt-fixing manipulatable part 101 so that they integrally rotate together. As shown in FIG. 25, a through hole 101a, which passes through in the front-rear direction and into which the fixing rod 42 is insertable, is provided in a central portion of the tilt-fixing manipulatable part 101 and the drive-side gear 102a. Because the tilt-fixing manipulatable part 101, the drive-side gear 102a and the fixing rod 42 are again disposed in a coaxial relationship, the tilt-fixing manipulatable part 101, the drive-side gear 102a and the fixing rod 42 are rotatable about a common rotational axis. That is, the rotary shaft (i.e. the drive-side gear 102a) of the tilt-fixing manipulatable part 101 is coaxial with the rotary shaft (i.e. the fixing rod 42) of the grip 41 (refer to FIG. 23).

As shown in FIG. 23, the follower-side gear 102b is provided on a front end of the transmission shaft 103, which extends in the front-rear direction, so that the follower-side gear 102b and the transmission shaft 103 rotate integrally (as one unit). Therefore, the follower-side gear 102b is rotatable about the longitudinal (rotational) axis of the transmission shaft 103. The follower-side gear 102b is aligned rightward of and meshes with the drive-side gear 102a. The rotation of the drive-side gear 102a is decelerated and transmitted by the follower-side gear 102b such that the input torque manually applied to the tilt-fixing manipulatable part 101 is amplified. The speed-reduction ratio of the drive-side gear 102a to the follower-side gear 102b is, for example, 1:2.2, but may be in a range of, e.g., 1:1.5 to 1:2.8, more preferably 1:2.0 to 1:2.5. As shown in FIG. 25, the transmission shaft 103 is provided rightward of the fixing rod 42 and leftward of a right-edge portion of the table-extension part 92. The transmission shaft 103 and the fixing rod 42 extend in parallel, preferably in a common horizontal plane.

Figure 24:
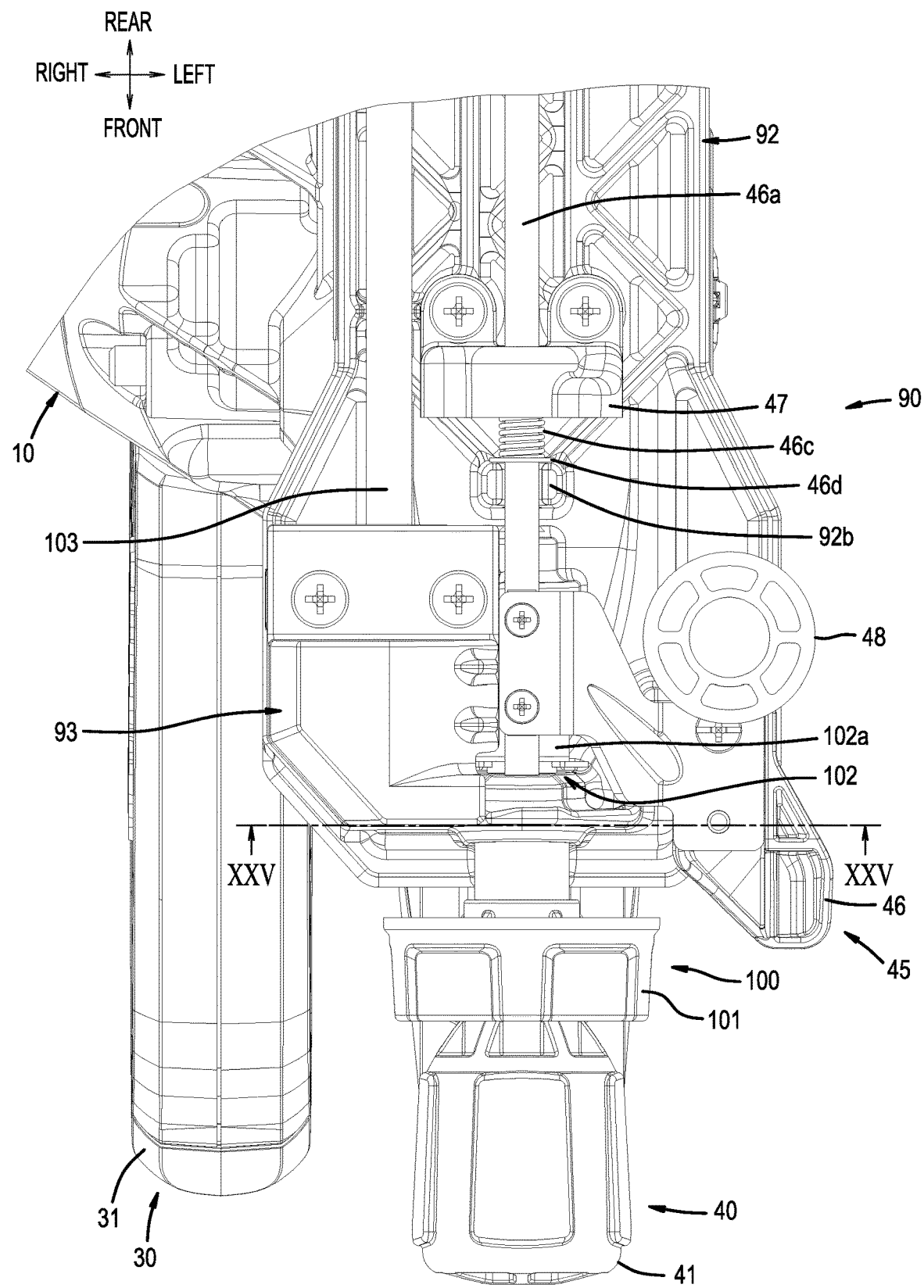
FIG. 24 is a bottom view in which a front-portion cover has been mounted on the speed-reducing gear part according to the third embodiment.

As shown in FIG. 24, a front-portion cover 93 defining a U-shaped groove is mounted on the lower portion of the table-extension part 92. The front-portion cover 93 covers, from below, the follower-side gear 102b (refer to FIG. 23) of the speed-reducing gear part 102, in particular. A lower surface of the table-extension part 92 also has a U-shaped groove, which extends in the front-rear direction and is open downward. A front portion of the transmission shaft 103 is rotatably supported about its axis by virtue of it being sandwiched, from both the upper and lower sides, by the pair of U-shaped grooves of the front-portion cover 93 and the table-extension part 92.

Figure 21:
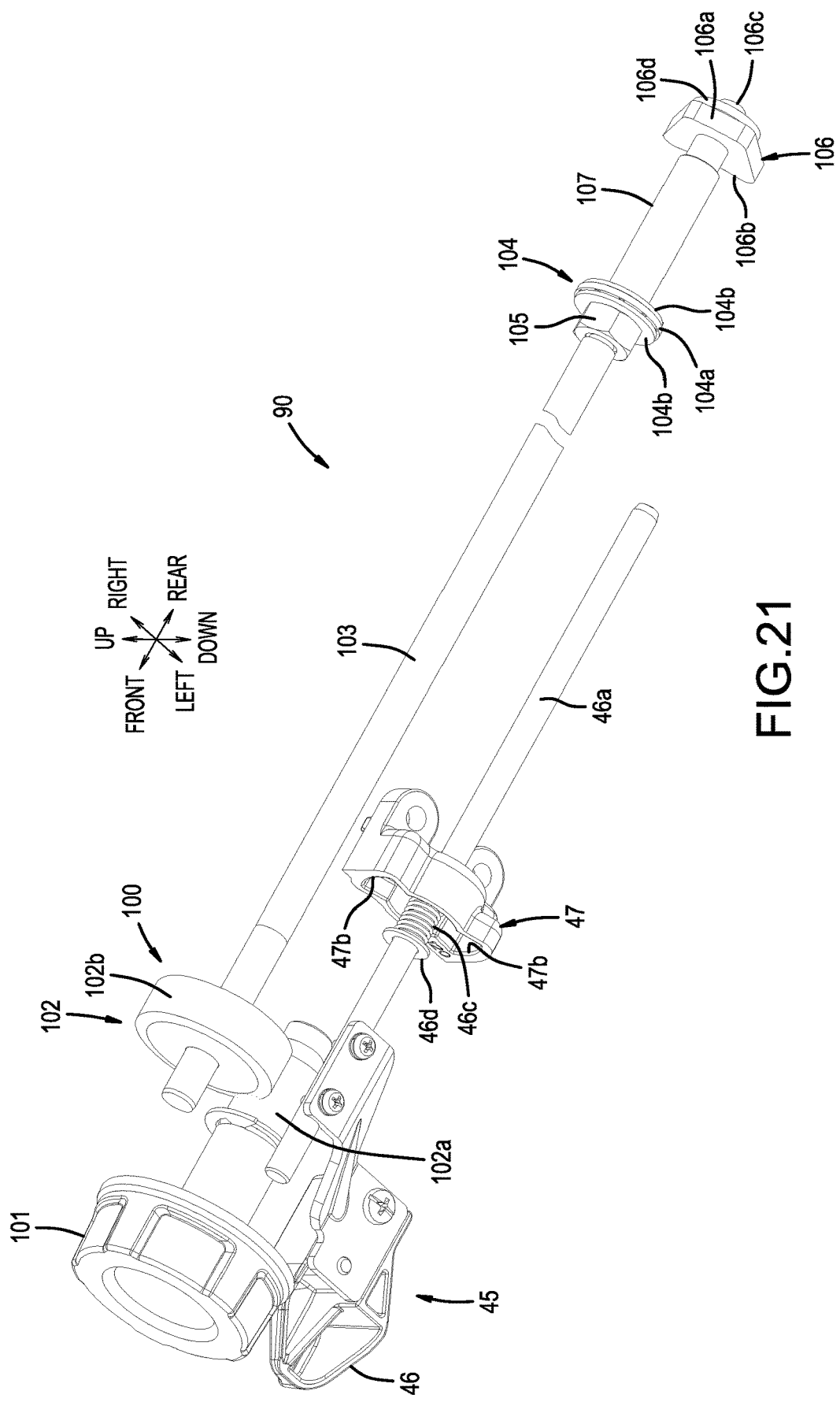
FIG. 21 is an oblique view of the tilt-fixing mechanism and the positive-lock mechanism according to the third embodiment.
Figure 22:
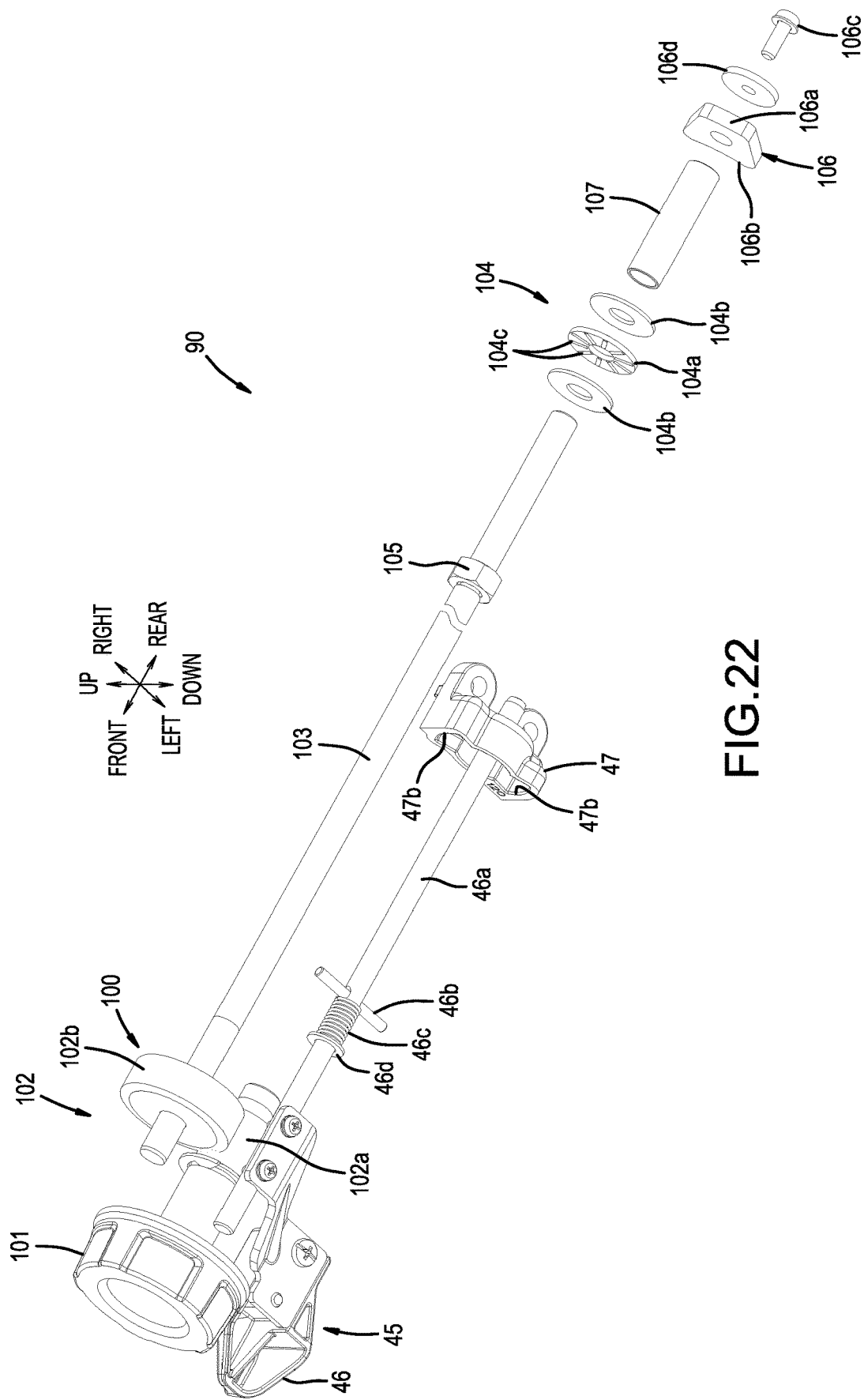
FIG. 22 is an exploded, oblique view of the tilt-fixing mechanism and an oblique view of the positive-lock mechanism.

As shown in FIGS. 21 and 22, a thrust needle bearing 104 and a receiving part (stop) 105 are mounted on a rear portion of the transmission shaft 103. The thrust needle bearing 104 and the receiving part 105 together serve as a support part for the transmission shaft 103. More specifically, the receiving part 105 serves both (i) to position the transmission shaft 103 in the axial direction relative to the turntable 91 and (ii) as one end of a clamping structure, which will be explained below. The thrust needle bearing 104 is disposed around the transmission shaft 103 and facilitates rotation of the transmission shaft 103 relative to the turntable 91 (refer to FIG. 20). The thrust needle bearing 104 comprises: a cage 104a, which has a disk shape; and a pair of washers 104b, which sandwich the cage 104a from both the front and rear sides. A plurality of needles 104c is disposed in the cage 104a such that the needles 104c are substantially equispaced in (around) the circumferential direction of the cage 104a. The longitudinal extension (dimension) of each of the needles 104c extends radially from a center of the cage 104a. The receiving part 105 is provided on the transmission shaft 103 forward of the thrust needle bearing 104 and is fixed to a rearward portion of the transmission shaft 103 such that the receiving part 105 is not movable in the axial direction relative to the transmission shaft 103. Therefore, the receiving part 105 restricts (blocks, stops) forward movement of the thrust needle bearing 104 relative to the transmission shaft 103.

As shown in FIGS. 21 and 22, a sleeve 107, which has a circular-cylinder shape, is disposed around the transmission shaft 103 rearward of the thrust needle bearing 104. A nut 106 is mounted on a rear-end portion of the transmission shaft 103 rearward of the sleeve 107. Rearward of the nut 106, a screw 106c is mounted on the transmission shaft 103 through a washer 106d. When the screw 106c is tightened onto the transmission shaft 103, rearward movement of the nut 106 is restricted.

As shown in FIGS. 22 and 26, the nut 106 has a circular sector shape when viewed in the front-rear direction. An outer-circumferential edge 106a, which extends arcuately, is provided on the outer-circumference surface of the circular sector-shaped nut 106. An inner-circumferential edge 106b, which extends arcuately, is provided on the inner-circumference surface of the circular sector-shaped nut 106. The outer-circumferential edge 106a and the inner-circumferential edge 106b each extend concentrically with the clockwise-counterclockwise tilting pivot 94a as the arc center.

As shown in FIG. 20, the transmission shaft 103 extends in the front-rear direction and passes through the through hole 91c and the arcuate hole 94b. The thrust needle bearing 104 and the receiving part 105 are disposed forward of the through hole 91c. A rear surface of the thrust needle bearing 104 is configured to abut the front end of the arm-support part 91b. The sleeve 107 is disposed inside the through hole 91c. Because the sleeve 107 is interposed radially between the transmission shaft 103 and a wall surface of the through hole 91c, the transmission shaft 103 is smoothly rotatable about its longitudinal axis inside the through hole 91c. The nut 106 is disposed rearward of the arcuate hole 94b. Accordingly, the thrust needle bearing 104 and the receiving part (stop) 105 on the one side and the nut 106 on the other side serve as two ends of a clamping structure that sandwich the main-body support arm 94 and the arm-support part 91b in the front-rear direction so that the thrust needle bearing 104 (pressed by the receiving part 105) and the nut 106 work together to apply a clamping force to the main-body support arm 94 and the arm-support part 91b.

As shown in FIG. 26, the main-body support arm 94 has an arcuate-shaped inner-circumferential wall 94c, which extends such that the clockwise-counterclockwise tilting pivot 94a is its arc center. The inner-circumferential wall 94c is provided rearward of the arcuate hole 94b. The inner-circumferential wall 94c is disposed inward in the radial direction of the arcuate hole 94b, centered on the clockwise-counterclockwise tilting pivot 94a. The inner-circumferential edge 106b of the nut 106 is configured to abut the inner-circumferential wall 94c so that the inner-circumferential wall 94c slides along the inner-circumferential edge 106b of the nut 106 when the main-body support arm 94 is tilted clockwise or counterclockwise. Rotation of the inner-circumferential edge 106b, which abuts the inner-circumferential wall 94c, about the axis of the transmission shaft 103 (refer to FIG. 20) is restricted (blocked). Therefore, when the main-body support arm 94 is being tilted clockwise or counterclockwise, the inner-circumferential wall 94c (which is centered on the clockwise-counterclockwise tilting pivot 94a) slides along the inner-circumferential edge 106b of the nut 106, which is stationary and non-rotatable.

Figure 27:
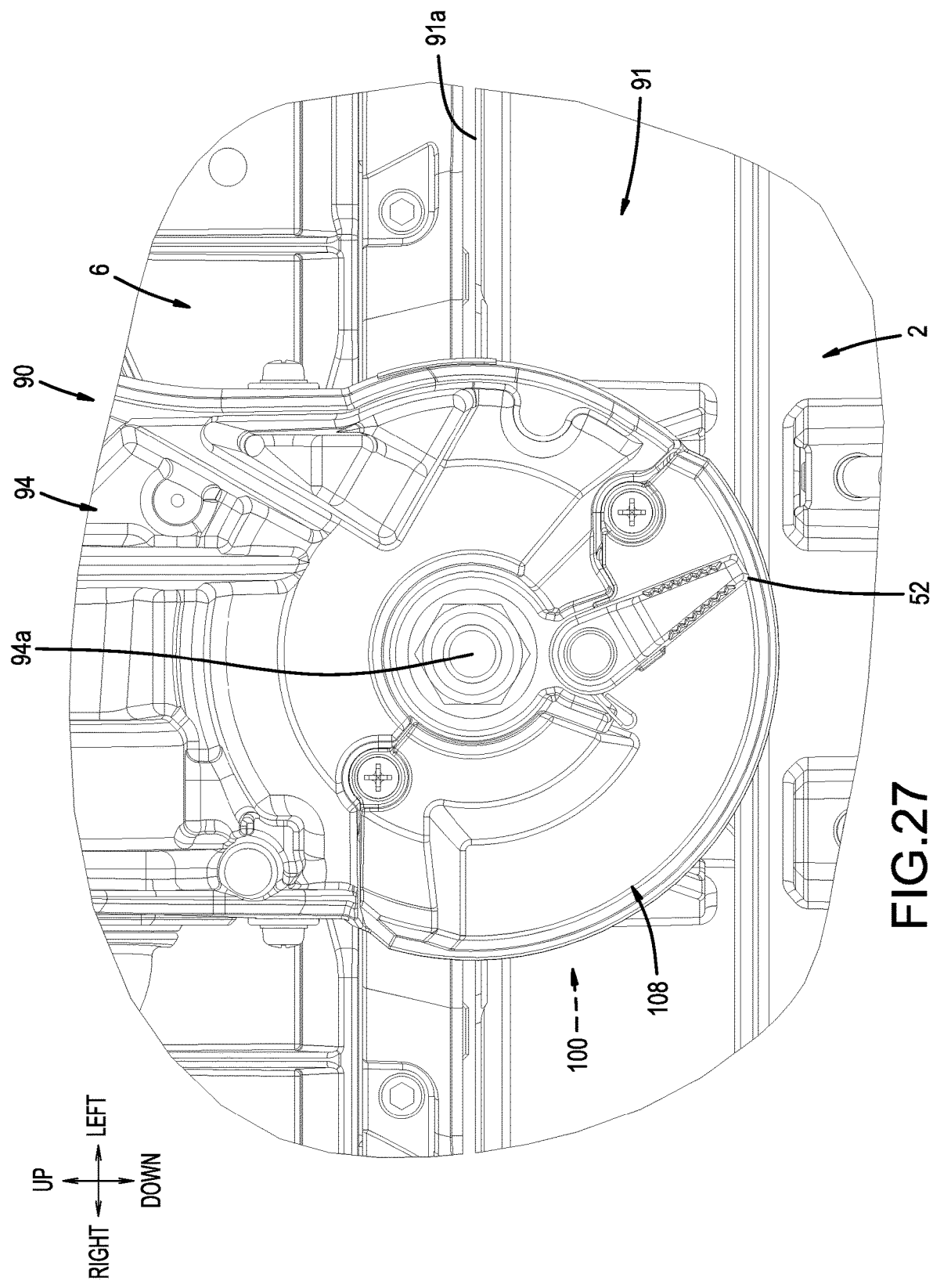
FIG. 27 is a rear view in which a rear-portion cover has been mounted on the main-body tilting part according to the third embodiment.

As shown in FIGS. 20 and 27, a rear-portion cover 108 is mounted on a rear end of a lower portion of the main-body support arm 94. The rear-portion cover 108 covers, from the outside, the rear portion of the tilt-fixing mechanism 100. Thereby, it is possible to prevent the ingress of wood chips, dust, etc. into the tilt-fixing mechanism 100.

As shown in FIG. 20, when the tilt-fixing manipulatable part 101 (refer to FIG. 23) is manually rotated, the transmission shaft 103 is rotated about its longitudinal axis at a slower rotational speed than the rotational speed of the tilt-fixing manipulatable part 101, but at increased torque owing to the speed-reducing (torque increasing) gear part 102. Rotation of the nut 106, which is mounted on the rear-end portion of the transmission shaft 103, about the axis of the transmission shaft 103 is restricted (blocked). Accordingly, when the transmission shaft 103 is rotated in one direction (e.g., the clockwise direction), the nut 106 tightens onto the transmission shaft 103. Thereby, an axial force (clamping force) in the extension direction of the transmission shaft 103 is generated between the receiving part 105 (via the thrust needle bearing 104) and the nut 106. The thrust needle bearing 104 and the nut 106, owing to their opposing axial forces, push (squeeze, clamp) the arm-support part 91b and the main-body support arm 94 from both the front and rear sides. As a result, the main-body support arm 94 becomes fixed relative to the arm-support part 91b and is positioned (held) at a fixed clockwise-counterclockwise tilt (bevel) angle. On the other hand, when the transmission shaft 103 is rotated in the reverse direction (e.g., the counterclockwise direction), the tightening of the nut 106 on the transmission shaft 103 is loosened. Thereby, the axial force (clamping force) between the thrust needle bearing 104 and the nut 106 is released. Thus, the main-body support arm 94 becomes tiltable clockwise and counterclockwise about the axis of the clockwise-counterclockwise tilting pivot 94a (refer to FIG. 26) relative to the arm-support part 91b.

In the benchtop cutting machine 90 of the third embodiment as explained above, the tilt-fixing mechanism 100 comprises the thrust needle bearing 104 and the receiving part 105, which support the transmission shaft 103 with respect to the turntable 91. More precisely, the receiving part (stop) 105 serves as one end of a clamping structure and the thrust needle bearing 104 facilitates rotation of the transmission shaft 103, especially during the final portion of the tightening when the thrust needle bearing 104 is pressed tightly against the turntable 91 by the receiving part (stop) 105. When the main-body support arm 94 and the arm-support part 91b of the turntable 91 are sandwiched (clamped) from both the front and rear sides by the receiving part 105 and the thrust needle bearing 104 on one side and the nut 106 on the other side, the orientation (tilt angle) of the main-body support arm 94 is fixed relative to the arm-support part 91b. Accordingly, the axial force (clamping force) that fixes the main-body support arm 94 acts between the thrust needle bearing 104 and the receiving part 105 on one side and the nut 106 on the other side. Consequently, an axial force does not arise in the transmission shaft 103 forward of the thrust needle bearing 104 and the receiving part 105. Thereby, the main-body support arm 94 can be fixed without a load being applied to the turntable 91.

In addition, in the above-described benchtop cutting machine 90, the thrust needle bearing 104 is provided in the support part that is mounted on the transmission shaft 103. Accordingly, a large force in the axial direction of the transmission shaft 103 can be received by the thrust needle bearing 104 while reducing friction for further rotation of the transmission shaft 103 relative to the sleeve 107 and nut 106 during the last stage of the tightening. Thereby, the main-body support arm 94 can be fixed (clamped) to the arm-support part 91b of the turntable 91 with a large axial force.

In addition, in the above-described benchtop cutting machine 90, the main-body support arm 94 is tiltable in the clockwise and counterclockwise directions about the clockwise-counterclockwise tilting pivot 94a to set the bevel angle. The nut 106 has a circular sector shape that conforms to the arcuate shape centered on the clockwise-counterclockwise tilting pivot 94a. Accordingly, because the arc of the arcuate shape defined on the main-body support arm 94 is centered on the clockwise-counterclockwise tilting pivot 94a, the arcuate shape can smoothly move (slide) along the circular sector shape of the nut 106. Consequently, the main-body support arm 94 can be smoothly tilted clockwise and counterclockwise. Furthermore, because the inner-circumferential portion 106b of the nut 106 abuts (and is rotationally restricted by) the inner-circumferential wall 94c of the main-body support arm 94, rotation of the nut 106 about the axis of the transmission shaft 103 can be restricted (blocked). Consequently, a large axial force can be received by the nut 106, which is blocked from rotating with the transmission shaft 103. Thereby, the main-body support arm 94 can be fixed (clamped) to the arm-support part 91b with a large axial force.

In addition, in the above-described benchtop cutting machine 90, the rear-portion cover 108 is provided rearward of the main-body support arm 94. Accordingly, it is possible to prevent the ingress of wood chips, dust, etc. by covering the surrounding of the transmission shaft 103 and the like with the rear-portion cover 108. Thereby, a loss of axial force (clamping force) caused by the intervention of wood chips, dust, etc. can be curtailed. Thereby, the main-body support arm 94 can be durably fixed (clamped) with a large axial force. In addition, by preventing the ingress of wood chips, dust, etc., the main-body support arm 94 can be smoothly tilted clockwise and counterclockwise in a durable manner.

In addition, in the above-described benchtop cutting machine 90, the front-portion cover 93 is provided on a bottom surface of the speed-reducing gear part 102. Accordingly, it is possible to prevent the ingress of wood chips, dust, etc. into the speed-reducing gear part 102. Consequently, the rotation of the tilt-fixing manipulatable part 101 can be more reliably transmitted to the rear portion of the transmission shaft 103 in a durable manner. Thereby, the manipulation of fixing the main-body support arm 94 remains smooth in a durable manner.

Other Modified Examples of the Present Teachings

Various modifications can be added to the benchtop cutting machines 1, 70, 90 according to the embodiments explained above. For example, an embodiment in which the rod pivot shaft 62a is provided at substantially the center of the pivot rod 62 in the left-right direction was illustrated above; however, to increase the mechanical advantage of the pivot rod 62 that is serving as a lever, a configuration may be used in which, for example, the rod pivot shaft 62a is provided at a location closer to the coupling part 63a. According to such a configuration, the pressing force with which the main-body support arm 50 is pressed toward the arm-support part 4b can be made larger, without changing the force with which the rod-abutting part 61b of the tilt-fixing manipulatable part 61 pushes the pivot rod 62 rearward. In addition or in the alternative, a configuration may be used in which the transmission shaft 63 is provided rightward of a left-end portion of the table-extension part 5 and leftward of the rotary spindle 2a. Furthermore, it is also noted that embodiments in which the transmission shafts 63, 83, 103 are provided at substantially the same height was illustrated above; however, for example, the transmission shaft 63, 83, 103 may be disposed downward of where the transmission shaft 63, 83, 103 is disposed in the embodiments. According to such a configuration, the triangle shape formed by the fixing rod 42, the transmission shaft 63, 83, 103 and the positioning pin 46a, 76a, viewed from the front side, can be made smaller, and thereby compactness of the table-extension part 5 in the up-down and left-right directions can be achieved. In addition, the speed-reduction ratio of the speed-reducing gear part 82, 102 can be made larger.

A sliding compound miter saw having the functions of both the slide cutting operation and the up-down pivoting cutting operation was illustrated above as the exemplary benchtop cutting machines 1, 70, 90; however, the present teachings are also applicable to, for example, benchtop compound miter saws that cut workpieces using the up-down pivot cutting operation alone and not the slide cutting operation.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved benchtop cutting machines, including without limitation compound miter saws, dual-bevel compound miter saws, sliding compound miter saws, and dual-bevel slide compound miter saws.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Benchtop cutting machine (first embodiment)
2 Base
2a Rotary spindle
2b Slide plate
3 Support-table part
4 Turntable
4a Table upper surface
4b Arm-support part
5 Table-extension part
5a Kerf board 5b Slot
5c, 5d Screw holes
5e Spring seat part
6 Positioning fence
6a Positioning surface
6b Fence-base part
7 Miter scale plate
7a Positioning recess
7b Fixing screw
10 Cutting-machine main body
10a Up-down swing pivot
11 Cutting tool
12 Fixed blade cover
13 Movable blade cover
14 Main-body support part
15 Dust-collecting guide
16 Rear-portion, dust-collection opening
17, 17a, 17b Dust-collecting hoses
18 Dust collector
20 Motor housing
20a Air-suction port
21 Electric motor
25 Battery-mount part
26 Battery
30 Handle part
31 Main handle
32 Lock-off button
33 Switch lever
34 Carrying handle
35 Adapter mounting part
36 Communication adapter
40 Turntable-fixing mechanism
41 Grip (turntable-fixing manipulatable part)
42 Fixing rod (turntable-fixing member)
43 Interposing member
43a Pivot shaft
43b Rod-abutting part
43c Interposing part
45 Positive-lock mechanism
46 Lock-release lever
46a Positioning pin
46b Engaging pin
46c Compression spring
46d Washer
47 Pin-support part
47a Through hole
47b Guide surface part
48 Adjustment bolt
50 Main-body support arm (main-body tilting part)
50a Clockwise-counterclockwise tilting pivot
50b Arcuate hole
51 Slide bar
52 Maximum-tilt-angle changing lever
60 Tilt-fixing mechanism
61 Tilt-fixing manipulatable part
61a Screw-shaft part
61b Rod-abutting part
61c Through hole
62 Pivot rod
62a Rod pivot shaft
63 Transmission shaft (tilt-fixing transmission shaft)
63a Coupling part
63b Threaded shaft end
64 Nut
64a Washer
70 Benchtop cutting machine (second embodiment)
71 Table-extension part
71a Kerf board
71b Slot
71c Spring seat part
71d Lever guide part
72 Main-body support arm (main-body tilting part)
72a Clockwise-counterclockwise tilting pivot
72b Arcuate hole
72c Rotation-stop hole
75 Positive-lock mechanism
76 Lock-release lever
76a Positioning pin
76b Compression spring
76c Flange part
80 Tilt-fixing mechanism
81 Tilt-fixing manipulatable part
81a Through hole
82 Speed-reducing gear part
82a Drive-side gear
82b Follower-side gear
83 Transmission shaft (tilt-fixing transmission shaft)
83a Threaded shaft end
84 Nut
84a Flat part
90 Benchtop cutting machine (third embodiment)
91 Turntable
91a Table upper surface
91b Arm-support part
91c Through hole
92 Table-extension part
92a Kerf board
92b Spring seat part
92c Through hole
93 Front-portion cover
94 Main-body support arm (main-body tilting part)
94a Clockwise-counterclockwise tilting pivot
94b Arcuate hole
94c Inner-circumferential wall
100 Tilt-fixing mechanism
101 Tilt-fixing manipulatable part
101a Through hole
102 Speed-reducing gear part
102a Drive-side gear
102b Follower-side gear
103 Transmission shaft (tilt-fixing transmission shaft)
104 Thrust needle bearing (support part)
104a Cage
104b Washer
104c Needle
105 Receiving part (support part)
106 Nut
106a Outer-circumferential portion
106b Inner-circumferential portion
106c Screw
106d Washer
107 Sleeve
108 Rear-portion cover

The invention claimed is:

1. A compound miter saw comprising:
a base;
a turntable supported on the base so as to be rotatable in a horizontal plane relative to the base;
a cutting-machine main body disposed upward of the turntable and rotatably supporting a cutting tool;
a turntable-fixing mechanism configured to fix rotation of the turntable relative to the base;
a main-body tilting part disposed rearward of the turntable and supporting the cutting-machine main body so as to be tiltable in clockwise and counterclockwise directions relative to the turntable; and
a tilt-fixing mechanism configured to fix the cutting-machine main body at a tilt angle relative to the turntable in the clockwise and counterclockwise directions;
wherein:
the turntable-fixing mechanism comprises a manually-rotatable turntable-fixing manipulatable part, and a turntable-fixing member configured to fix the turntable with respect to the base by manually rotating the turntable-fixing manipulatable part;
the turntable-fixing manipulatable part is disposed forward of a front surface of the turntable, downward of an upper surface of the turntable, and at a center of the turntable in a left-right direction;
the tilt-fixing mechanism comprises a manually-rotatable tilt-fixing manipulatable part;
a rotary shaft of the tilt-fixing manipulatable part is provided coaxially with a rotary shaft of the turntable-fixing manipulatable part; and
the tilt-fixing manipulatable part is disposed forward of the front surface of the turntable and rearward of the turntable-fixing manipulatable part.

2. The compound miter saw according to claim 1, wherein the tilt-fixing mechanism comprises a tilt-fixing transmission shaft that extends in the front-rear direction from a front portion of the turntable to the main-body tilting part without intersecting a center of rotation of the turntable.

3. The compound miter saw according to claim 2, further comprising:
a positive-lock mechanism configured to lock the turntable at one of a plurality of predetermined miter angles;
wherein:
the tilt-fixing transmission shaft and the turntable-fixing member extend in parallel in a plane that extends in the left-right direction; and
a positioning pin of the positive-lock mechanism is located downward of the turntable-fixing member.

4. The compound miter saw according to claim 2, wherein:
the tilt-fixing mechanism comprises a pivot rod, which is pivotable in the front-rear direction;
a first axial end portion of the pivot rod is configured to abut the tilt-fixing manipulatable part;
a second axial end portion of the pivot rod is operably coupled to the tilt-fixing transmission shaft;
the rotary shaft of the tilt-fixing manipulatable part comprises a screw-shaft part configured to displace the tilt-fixing manipulatable part in the front-rear direction when manually rotated; and
rearward displacement of the tilt-fixing manipulatable part and the screw-shaft part causes the pivot rod, which abuts the tilt-fixing manipulatable part, to pivot and generate a forward pulling force on the tilt-fixing transmission shaft, whereby the main-body tilting part is clamped and thereby fixed to the turntable by the forward pulling force.

5. The compound miter saw according to claim 2, wherein:
the tilt-fixing mechanism comprises a speed-reducing gear part that comprises a drive-side gear, which is provided on the tilt-fixing manipulatable part, and a follower-side gear, which is provided on the tilt-fixing transmission shaft, the drive-side gear serving as the rotary shaft of the tilt-fixing mechanism;
a threaded shaft end is provided on a rear portion of the tilt-fixing transmission shaft;
a nut is threadably mounted on the threaded shaft end; and
manual rotation of the tilt-fixing manipulatable part causes the tilt-fixing transmission shaft to rotate about its longitudinal axis via the speed-reducing gear part, whereby the main-body tilting part is clamped and thereby fixed to the turntable by the tightening of the threaded shaft end and the nut to one another.

6. The compound miter saw according to claim 5, further comprising:
a stop fixedly mounted on the tilt-fixing transmission shaft such that clamping of the main-body tilting part and the turntable between the stop and the nut causes the main-body tilting part to be fixed at a selected tilt angle.

7. The compound miter saw according to claim 6, further comprising a thrust needle bearing mounted on the tilt-fixing transmission shaft between the stop and a portion of the turntable that rotatably supports the tilt-fixing transmission shaft.

8. The compound miter saw according to claim 6, wherein:
the main-body tilting part is tiltable in the clockwise and counterclockwise directions about a clockwise-counterclockwise tilting pivot;
the nut has a circular sector shape that matches an arcuate shape defined on the main-body tilting part; and
the circular sector shape and the arcuate shape have a common center located at the clockwise-counterclockwise tilting pivot.

9. The compound miter saw according to claim 6, further comprising a rear-portion cover attached to and covering a rearward side of the main-body tilting part.

10. The compound miter saw according to claim 6, further comprising a front-portion cover covering a bottom surface of the speed-reducing gear part.

11. The compound miter saw according to claim 1, wherein the tilt-fixing mechanism is configured such that:
manual rotation of the tilt-fixing manipulatable part in a first rotational direction causes the tilt-fixing mechanism to fix the tilt angle of the cutting-machine main body relative to the turntable; and
manual rotation of the tilt-fixing manipulatable part in a second rotational direction, which is opposite of the first rotational direction, causes the tilt-fixing mechanism to release the fixing of the tilt angle of the cutting-machine main body relative to the turntable.

12. The compound miter saw according to claim 1, wherein:
the rotary shaft of the tilt-fixing manipulatable part is hollow; and
the rotary shaft of the turntable-fixing manipulatable part passes through the rotary shaft of the tilt-fixing manipulatable part.

13. A compound miter saw comprising:
a base;
a turntable supported on the base so as to be rotatable in a horizontal plane relative to the base;
a cutting-machine main body disposed upward of the turntable and rotatably supporting a cutting tool;
a turntable-fixing mechanism comprising a first knob configured to be manually rotated and a fixing rod connected to the first knob so as to rotate therewith, the turntable-fixing mechanism being configured to fix rotation of the turntable relative to the base to set a miter cutting angle;

a support arm tiltably connected to a rearward side of the turntable and supporting the cutting-machine main body so as to be tiltable in clockwise and counterclockwise directions relative to the turnable to set a bevel cutting angle; and a tilt-fixing mechanism comprising a second knob configured to be manually rotated, a rotary shaft connected to the second knob so as to rotate therewith and a transmission shaft operably coupled to the rotary shaft, the tilt-fixing mechanism being configured to fix the bevel cutting angle of the cutting tool;

wherein:

the first knob and the second knob are disposed forward of a front end surface of an extension arm of the turntable, downward of an upper surface of the turntable, and at a center of the extension arm in a left-right direction;

the fixing rod extends through and coaxially with the rotary shaft; and the second knob is disposed between the first knob and the front end surface of the extension arm.

14. The compound miter saw according to claim 13, wherein the transmission shaft extends straight in a front-rear direction from a front portion of the extension arm to the support arm without intersecting a center of rotation of the turntable.

15. The compound miter saw according to claim 14, further comprising:

a positive-lock mechanism configured to lock the turntable at one of a predetermined number of predetermined miter angles;

wherein:

the fixing rod and the transmission shaft extend in parallel in a plane that extends in the left-right direction; and a positioning pin of the positive-lock mechanism is located downward of the fixing rod in the up-down direction.

16. The compound miter saw according to claim 15, wherein:

the tilt-fixing mechanism further comprises a pivot rod that is pivotable in the front-rear direction about a pivot axis that extends in the up-down direction;

a first axial end portion of the pivot rod is configured to abut the rotary shaft;

a second axial end portion of the pivot rod is linked by a hinge connection to the transmission shaft;

the rotary shaft is configured as a hollow sleeve having a male thread on at least a portion of an outer circumference of the hollow sleeve, the rotary shaft being configured to displace in the front-rear direction in response to manual rotation of the second knob; and the second knob, the rotary shaft and the pivot rod are configured such that manual rotation of the second knob in one rotational direction causes the rotary shaft to displace rearwardly and press against the first axial end portion of the pivot rod to generate a forward pulling force on the transmission shaft that clamps the support arm against a rearward portion of the turntable.

17. The compound miter saw according to claim 13, wherein the transmission shaft is operably coupled to the rotary shaft such that rotation of the second knob moves the transmission shaft in its longitudinal direction to fix or release the bevel cutting angle of the cutting tool.

18. A compound miter saw comprising:

a base;

a turntable supported on the base so as to be rotatable in a horizontal plane relative to the base;

a cutting-machine main body disposed upward of the turntable and rotatably supporting a cutting tool;

a turntable-fixing mechanism comprising a first knob configured to be manually rotated and a fixing rod connected to the first knob so as to rotate therewith, the turntable-fixing mechanism being configured to fix rotation of the turntable relative to the base to set a miter cutting angle;

a support arm tiltably connected to a rearward side of the turntable and supporting the cutting-machine main body so as to be tiltable in clockwise and counterclockwise directions relative to the turnable to set a bevel cutting angle; and a tilt-fixing mechanism comprising a second knob configured to be manually rotated, a rotary shaft connected to the second knob so as to rotate therewith and a transmission shaft operably coupled to the rotary shaft, the tilt-fixing mechanism being configured to fix the bevel cutting angle of the cutting tool;

wherein:

the first knob and the second knob are disposed forward of a front end surface of an extension arm of the turntable, downward of an upper surface of the turntable, and at a center of the extension arm in a left-right direction;

the fixing rod extends through and coaxially with the rotary shaft;

the second knob is disposed between the first knob and the front end surface of the extension arm;

the transmission shaft extends straight in a front-rear direction from a front portion of the extension arm to the support arm without intersecting a center of rotation of the turntable;

the rotary shaft is configured as a drive-shaft gear having a hollow interior;

the tilt-fixing mechanism further comprises a follower-side gear connected to the transmission shaft so as to rotate therewith, the follower-side gear meshing with the drive-shaft gear;

a threaded shaft end is defined on a rear portion of the transmission shaft;

a nut is threadably mounted on the threaded shaft end; and the second knob, the drive-side gear, the follower-side gear, the transmission shaft and the nut are configured such that manual rotation of the second knob in one rotational direction causes the transmission shaft to rotate about its axis and tighten the nut on the threaded shaft end to generate a clamping force that clamps the support arm against a rearward portion of the turntable.

19. The compound miter saw according to claim 18, further comprising:

a stop defined on the transmission shaft such that tightening of the nut generates a clamping force between the stop and the nut that clamps the support arm against the rearward portion of the turntable at a selected bevel angle.

20. The compound miter saw according to claim 19, further comprising:

a thrust needle bearing disposed around the transmission shaft and located between the stop and the rearward portion of the turntable.

21. The compound miter saw according to claim 20, wherein:

the support arm is tiltable in the clockwise and counterclockwise directions about a clockwise-counterclockwise tilting pivot;

the nut has a circular sector shape that matches an arcuate shape defined on the support arm; and the circular sector shape and the arcuate shape have a common center located at the clockwise-counterclockwise tilting pivot.

22. A compound miter saw comprising:

a turntable that is selectively rotatable relative to a base to set a miter angle, the turntable having an extension arm;

a carriage rotatably supporting a miter saw blade and being both pivotable and tiltable relative to the turntable;

a miter angle locking mechanism comprising a fixing rod that is rotatably and axially displaceably supported by the extension arm and is manually rotatable by a first knob; and a bevel angle locking mechanism comprising a hollow sleeve that is rotatably supported by the extension arm and is manually rotatable by a second knob;

wherein:

the fixing rod extends coaxially through the hollow sleeve and the second knob;

the second knob is disposed closer to a terminal end of the extension arm than the first knob;

the second knob has a larger outer diameter than the first knob;

a vertical plane is defined by pivoting movement of the miter saw blade perpendicular to an upper surface of the turntable;

the vertical plane intersects the fixing rod and the hollow sleeve; and wherein the bevel angle locking mechanism is configured such that:

rotation of the second knob in a first rotational direction locks the bevel angle of the miter saw blade relative to the turntable; and rotation of the second knob in a second rotational direction, which is opposite of the first rotational direction, releases the bevel angle of the miter saw blade relative to the turntable.

23. The compound miter saw according to claim 22, further comprising:

a miter angle positive stop mechanism comprising a lock-release lever configured to axially displace a positioning pin having a tip portion configured to engage one of a plurality of positioning recesses respectively defined in a miter scale plate at prescribed miter angle positions, the miter scale plate being affixed to the base;

wherein:

the positioning pin is disposed below the fixing rod and the hollow sleeve in the vertical plane;

the bevel angle locking mechanism further comprises a transmission shaft that is operably coupled to the hollow sleeve such that rotation of the second knob causes the transmission shaft to move along its longitudinal direction, the transmission shaft extending in parallel to the hollow sleeve; and the transmission shaft extends from the extension arm to a rearward portion of the turntable without intersecting a center of rotation of the turntable.

\* \* \* \* \*